United States Patent
Namba et al.

(10) Patent No.: US 7,682,011 B2
(45) Date of Patent: Mar. 23, 2010

(54) RECORDING INK, INK CARTRIDGE, INK RECORD, INKJET RECORDING APPARATUS AND INKJET RECORDING PROCESS

(75) Inventors: Michihiko Namba, Yokohama (JP); Hisashi Habashi, Isehara (JP); Mariko Kojima, Komae (JP); Tomohiro Inoue, Yokohama (JP); Akiko Bannai, Tokyo (JP); Akihiko Gotoh, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/593,345

(22) Filed: Jan. 10, 2007

(65) Prior Publication Data

US 2007/0221078 A1    Sep. 27, 2007

(30) Foreign Application Priority Data

Mar. 19, 2004 (JP) .............................. 2004-080332
Feb. 24, 2005 (JP) .............................. 2005-049309

(51) Int. Cl.
*G01D 11/00* (2006.01)

(52) U.S. Cl. ........................................ 347/100; 347/95

(58) Field of Classification Search ................ 347/100, 347/95, 96, 101; 106/31.6, 31.13, 31.27; 523/160

See application file for complete search history.

(56) References Cited

U.S. PATENT DOCUMENTS

| | | | | |
|---|---|---|---|---|
| 5,980,624 A | * | 11/1999 | Ichikawa | 106/31.58 |
| 6,109,728 A | * | 8/2000 | Kakuda et al. | 347/45 |
| 2004/0003754 A1 | * | 1/2004 | Ishibashi et al. | 347/100 |
| 2005/0054751 A1 | * | 3/2005 | Namba et al. | 523/160 |
| 2005/0170989 A1 | * | 8/2005 | Nagashima et al. | 510/411 |
| 2005/0231575 A1 | | 10/2005 | Bannai et al. | |

FOREIGN PATENT DOCUMENTS

| | | |
|---|---|---|
| EP | 1 473 338 A1 | 11/2004 |
| JP | 04-106168 | 4/1992 |
| JP | 09-095635 | 4/1997 |
| JP | 09-124982 | 5/1997 |
| JP | 10-140064 | 5/1998 |
| JP | 11-323221 | * 11/1999 |
| JP | 2000-017207 | 1/2000 |
| JP | 12-053897 | 2/2000 |

(Continued)

OTHER PUBLICATIONS

U.S. Appl. No. 11/575,169, filed Mar. 13, 2007, Namba et al.

(Continued)

*Primary Examiner*—Manish S Shah
(74) *Attorney, Agent, or Firm*—Oblon, Spivak, McClelland, Maier & Neustadt, L.L.P.

(57) ABSTRACT

The object of the present invention is to provide a recording ink which is excellent in color developing properties, has a high delivery stability, can improve remarkably color saturation and can form a high-quality image, when the ink is used for printing a plain paper, further an ink cartridge, an ink record, an inkjet recording apparatus and an inkjet recording process, wherein the recording ink having water, a wetting agent, a surfactant, and a colorant.

15 Claims, 13 Drawing Sheets

| | FOREIGN PATENT DOCUMENTS | | JP | 2004-292523 | 10/2004 |
|---|---|---|---|---|---|
| JP | 2000-53897 | 2/2000 | | | |
| JP | 2000-191972 | 7/2000 | | | |
| JP | 2000-239590 | 9/2000 | | | |
| JP | 2003-335987 | 11/2003 | | | |
| JP | 2004-051695 | 2/2004 | | | |
| JP | 2004-075767 | 3/2004 | | | |

OTHER PUBLICATIONS

U.S. Appl. No. 12/064,418, filed Feb. 21, 2008, Habashi et al.
U.S. Appl. No. 12/094,235, filed May 19, 2008, Namba et al.

* cited by examiner tr Pw tf

FIG. 14

|  | S1 | S2 | S3 | S4 | S5 | S6 | S7 |
|---|---|---|---|---|---|---|---|
| Mj 1 | 0 | 0 | 1 | 1 | 1 | 1 | 0 |
| Mj 2 | 1 | 0 | 0 | 1 | 0 | 1 | 0 |
| Mj 3 | 1 | 0 | 0 | 0 | 0 | 1 | 1 |
| Slight driving (No printing) | 1 | 0 | 0 | 0 | 0 | 0 | 0 |

FIG. 16

|  | S1 | S2 | S3 | S4 | S5 | S6 | S7 | S8 |
|---|---|---|---|---|---|---|---|---|
| Mj 1 | 0 | 0 | 1 | 1 | 1 | 1 | 0 | 1 |
| Mj 2 | 1 | 0 | 0 | 0 | 0 | 1 | 0 | 1 |
| Mj 3 | 1 | 0 | 0 | 0 | 0 | 1 | 1 | 1 |
| Slight driving (No printing) | 0 | 0 | 0 | 0 | 0 | 0 | 0 | 1 |

RECORDING INK, INK CARTRIDGE, INK RECORD, INKJET RECORDING APPARATUS AND INKJET RECORDING PROCESS

TECHNICAL FIELD

The present invention relates to a recording ink and an ink cartridge, an ink record, an inkjet recording apparatus and an inkjet recording process which are provided using the recording ink.

BACKGROUND ART

Conventionally, for an inkjet recording apparatus, as a colorant, a hydrophilic ink comprising a water-soluble dye is mainly used. The dye ink has a disadvantage to be poor in weathering properties and water resistance. Therefore recently, studies on a pigment ink produced using a pigment instead of the water-soluble dye have been developed. However, the pigment ink is poor yet in color developing properties and stability in comparison with the dye ink and particularly accompanying with the improvement of the technique for the high quality image of the printer for the OA, with respect to the pigment ink used for the plain paper, plain paper properties, such as printing quality, hue, color saturation, gloss and shelf stability compared to those of the dye ink are required.

As a material for a magenta ink or a cyan ink which are used as a pigment ink, respectively C.I. pigment red 122 or pigment blue 15:3 is generally used; however, the color reproduction range of these pigment inks differs from that of the dye ink. Therefore, the toning for minimizing the hue error is performed and as a result of the toning, the color saturation is lowered and a disadvantage is caused with respect to the printing quality.

On the other hand, the improvement of the pigment itself for change the hue without the toning has been developed, for example, a cyan pigment having a hue in the same color gamut as that of the cyan dye produced using a phthalocyanine pigment having a specified crystal structure is proposed (see Japanese Patent Application Laid-Open (JP-A) No. 2000-17207). However in this case, all problems, such as a problem with respect to the cost, are not yet solved.

Further, many proposals are performed with respect to an ink set comprising a black ink produced using a pigment, a yellow ink, a magenta ink and a cyan ink which are produced using a dye (see JP-A No. 2000-239590). However, in these proposals, the inks are unsatisfactory in plain paper properties when the plain paper is printed using the inks.

An ink set consisting of a black ink comprising a self-dispersible carbon black and color inks comprising a colorant having a reverse polarity to that of the colorant of the black ink is proposed (see JP-A No. 10-140064). In addition, an ink set comprising inks of a colorant-impregnating resin dispersion type which have various ionicities each other is proposed (see JP-A No. 2000-191972). However, in these proposals, with respect to the print produced using the ink set, spreading of the ink at the interface of two colors can be improved; however, other plain paper properties were unsatisfactory yet.

Further, it is proposed that as a water-soluble organic solvent in a hydrophilic ink composition, for improving the moisture retention of the pen head in the case where the ink is used for a writing material, 3-methyl-1,3-butanediol is used (see JP-A No. 04-106168). However, in this patent document, the improvement of plain paper properties as a recording ink is neither disclosed nor indicated.

DISCLOSURE OF INVENTION

The object of the present invention is to provide a recording ink which is excellent in color developing properties, has a high delivery stability, can improve remarkably color saturation and can form a high-quality image, when the ink is used for printing a plain paper, an ink cartridge, ink record, inkjet recording apparatus and inkjet recording process using the recording ink.

The recording ink according to the present invention comprises at least water, a wetting agent, a surfactant and a colorant and by a wetting agent comprising 3-methyl-1,3-butanediol, the recording ink is excellent in color developing properties, has a high delivery stability, can improve remarkably color saturation and can form a high-quality image, when the ink is used for printing a plain paper.

In this case, with respect to the recording ink according to the present invention preferred are such aspects as an aspect in which the wetting agent is any one of (1) a combination of 3-methyl-1,3-butanediol and glycerin and (2) a combination selected from the group consisting of combinations of (i) 3-methyl-1,3-butanediol, glycerin and at least one of (ii) 1,3 butanediol, triethylene glycol, 1,5-pentadiol, propylene glycol, 2-methyl-2,4-pentadiol, diethylene glycol, dipropylene glycol, trimethylol propane and trimethylol ethane, an aspect in which the amount of the wetting agent in the recording ink is 20% by mass to 50% by mass, an aspect in which the colorant is an aqueous dispersion of polymer fine particles comprising a colorant, an aspect in which the polymer of the polymer fine particles is any one of a vinyl polymer and a polyester polymer, an aspect in which the surfactant is one selected from the group consisting of an anionic surfactant, a nonionic surfactant, an amphoteric surfactant and a surfactant containing fluorine, an aspect in which the surfactant comprises any one of a $C_8$ to $C_{11}$ polyol compound and a $C_8$ to $C_{11}$ glycol ether compound, an aspect in which the $C_8$ to $C_{11}$ polyol compound is any one of 2-ethyl-1,3-hexanediol and 2,2,4-trimethyl-1,3-pentanediol, an aspect in which the recording ink has a viscosity measured at 25° C. of 5 mPa·sec to 20 mPa·sec, an aspect in which the recording ink is at least one selected from the group consisting of a cyan ink, a magenta ink, a yellow ink and a black ink and an aspect in which the black ink comprises a carbon black as a colorant, wherein the carbon black has in the surface thereof at least one hydrophilic group and is dispersible in water under the absence of a dispersant.

The ink cartridge according to the present invention comprises the above-noted recording ink according to the present invention contained in a container and is preferably used for the printer of an inkjet recording system. By recording using the ink contained in the ink cartridge, the recording ink is excellent in color developing properties, has a high delivery stability and can improve remarkably color saturation and can form a high-quality image, when the ink is used for printing a plain paper.

The inkjet recording apparatus according to the present invention comprises at least an ink ejecting unit by which to the recording ink according to the present invention, an energy is applied and the recording ink is ejected for forming the image. In the inkjet recording apparatus according to the present invention, the ink ejecting unit applies an energy to the recording ink according to the present invention and ejects the recording ink for forming the image. Therefore, when the ink is used for printing a plain paper, the recording ink is excellent in color developing properties, has a high delivery stability and can improve remarkably color saturation and can form a high-quality image.

The inkjet recording method according to the present invention comprises at least the ejecting of a recording ink by which to the recording ink according to the present invention, an energy is applied and the recording ink is ejected for forming the image. In the ink ejecting of the inkjet recording method, to the recording ink according to the present invention, an energy is applied and the recording is ejected, thereby forming the image. Therefore, when the ink is used for printing a plain paper, the recording ink is excellent in color developing properties, has a high delivery stability and can improve remarkably color saturation and can form a high-quality image.

The ink record according to the present invention comprises the image formed on a recording medium using the recording ink according to the present invention. In the ink record, the recording ink is excellent in color developing properties, has a high delivery stability and can improve remarkably color saturation and can hold a high-quality image in the recording medium.

BRIEF DESCRIPTION OF DRAWINGS

FIG. 14 is a table summarizing conditions for selecting driving pulses among the driving conditions for the pulse pattern comprising five pulses.

FIG. 16 is a table summarizing conditions for selecting driving pulses among the driving conditions for the pulse pattern comprising seven pulses.

BEST MODE FOR CARRYING OUT THE INVENTION

Recording Ink

Figure 1:
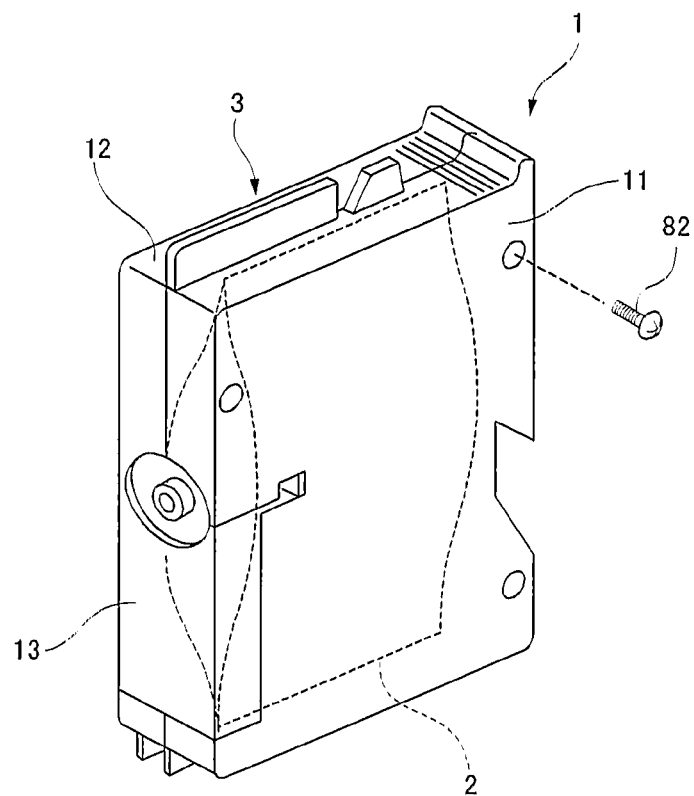
FIG. 1 is an explanatory view schematically showing an example of the ink cartridge according to the present invention.

The recording ink according to the present invention comprises at least water, a wetting agent, a surfactant and a colorant, and optionally other components.

—Wetting Agent—

The wetting agent comprises at least 3-methyl-1,3-butanediol and preferred examples of the wetting agent include (1) a combination of 3-methyl-1,3-butanediol and glycerin and (2) a combination selected from the group consisting of combinations of 3-methyl-1,3-butanediol, glycerin and at least one of 1,3 butanediol, triethylene glycol, 1,5-pentadiol, propylene glycol, 2-methyl-2,4-pentadiol, diethylene glycol, dipropylene glycol, trimethylol propane and trimethylol ethane.

With respect to the wetting agents (1) and (2), it is more advantageous that the wetting agent comprises a combination among combinations comprising 3-methyl-1,3-butanediol and other wetting agents in that advantage of each wetting agent can be taken and the viscosity of the wetting agent can be easily controlled.

Among the combinations, a combination of 3-methyl-1,3-butanediol and glycerin, a combination of 3-methyl-1,3-butanediol, glycerin and 1,3 butanediol and a combination of 3-methyl-1,3-butanediol, 3-methyl-1,5-pentanediol and glycerin are most preferred.

The recording ink according to the present invention may comprise besides the above-noted wetting agents, optionally another wetting agent. Preferred examples of the other wetting agent include a succharide. Examples of the succharide include a monosuccharide, a disaccharide, an oligosuccharide (including a trisuccharide and a tetrasuccharide), a polysaccharide and a derivative thereof. Among them, a glucose, a mannose, a fructose, a ribose, a xylose, an arabinose, a galactose, a maltose, a cellobiose, a lactose, a sucrose, a trehalose and a maltoriose are preferred. "The polysaccharide" means a succharide in broad sense and examples thereof include a substance which is present widely in the nature, such as α-cyclodexstrin and a cellulose.

Examples of the derivative of the succaride include a reduced succharide of the above-noted succharide (e.g., a succharide alcohol represented by the formula: $HOCH_2(CHOH)_nCH_2OH$ ("n" is an integer of 2 to 5.)), an oxidized succharide of the above-noted succharide (e.g., an aldonic acid and an uronic acid), an amino acid and a thio-acid. Among them, the succharide alcohol is most preferred. Examples of the succharide alcohol include a multitol and a sorbitol.

The amount of the succharide in the recording ink is preferably 0.1% by mass to 40% by mass, more preferably 0.5% by mass to 30% by mass.

The amount of the wetting agent in the recording ink is preferably 20% by mass to 50% by mass, more preferably 20% by mass to 40% by mass. When the amount is less than 20% by mass, the delivery stability and the color developing properties of the recording ink is lowered. On the other hand, when the amount is more than 50% by mass, accompanying with the elevation of the viscosity of the recording ink, the delivery stability of the recording ink is lowered sometimes.

—Colorant—

Preferred examples of the colorant include an aqueous dispersion (emulsion) of polymer fine particles comprising a colorant.

Here, the above-noted "comprising a colorant" means at least one of "a state in which the colorant is encapsulated in polymer fine particles" and "a state in which the colorant is adsorbed on the surface of polymer fine particles". In this case, it is not necessary that the whole colorant incorporated in the recording ink according to the present invention is encapsulated in the polymer fine particles or adsorbed on the surface of the polymer fine particles and so long as the effect of the present invention is not impaired, the colorant may be dispersed in the emulsion. The colorant is not restricted so long as the colorant is water-insoluble or water-slight soluble and can be adsorbed on the polymer and may be properly selected depending on the application.

Here, "water-insoluble or water-slight soluble" means that the colorant cannot be dissolved in an amount of 10 parts by mass or more in 100 parts by mass of water at 20° C. "Being dissolved" means that in an upper layer or lower layer of the water, the separation or sedimentation of the colorant is not visually observed.

Examples of a polymer forming the above-noted emulsion include a vinyl polymer, a polyester polymer and a polyurethane polymer. Among them, most preferred examples of the polymer include the vinyl polymer and the polyester polymer and specific preferred examples of the polymer include polymers disclosed in JP-A Nos. 2000-53897 and 2001-139849.

The average particle diameter of the polymer fine particles comprising the colorant is preferably 0.16 μm or less in the ink.

The amount of the polymer fine particles in the recording ink is preferably 8% by mass to 20% by mass, more preferably 8% by mass to 12% by mass, in terms of the solid mass, based on the mass of the recording ink.

The amount of the colorant is preferably 10 parts by mass to 200 parts by mass, more preferably 25 parts by mass to 150 parts by mass, relative to 100 parts by mass of the polymer fine particles.

Examples of the colorant include a dye, such as an oil-soluble dye and a dispersion dye and a pigment. From the viewpoint of the advantageous adsorptivity and encapsulating properties, the oil-soluble dye and the dispersion dye are preferably used and from the viewpoint of the light resistance of the formed image, the pigment is preferably used.

From the viewpoint of the effective impregnating of the dye in the polymer fine particles, the dye is dissolved in an organic solvent, such as a ketone solvent in an amount of preferably 2 g/litter, more preferably 20 g/litter to 600 g/litter.

The oil-soluble dye is classified in the Color Index into the acidic dye, the direct dye, the basic dye, the reactive dye and the dye for the food. Among them, a dye which is excellent in water resistance and light resistance is preferably used.

Examples of the acidic dye and the dye for the food include C. I. Acid Yellow 17, 23, 42, 44, 79 and 142; C. I. Acid Red 1, 8, 13, 14, 18, 26, 27, 35, 37, 42, 52, 82, 87, 89, 92, 97, 106, 111, 114, 115, 134, 186, 249, 254 and 289; C. I. Acid Blue 9, 29, 45, 92 and 249; C. I. Acid Black 1, 2, 7, 24, 26 and 94; C. I. Food Yellow 2, 3 and 4; C. I. Food Red 7, 9 and 14; and C. I. Food Black 1 and 2.

Examples of the direct dye include C. I. Direct Yellow 1, 12, 24, 26, 33, 44, 50, 86, 120, 132, 142 and 144; C. I. Direct Red 1, 4, 9, 13, 17, 20, 28, 31, 39, 80, 81, 83, 89, 225 and 227; C. I. Direct Orange 26, 29, 62 and 102; C. I. Direct Blue 1, 2, 6, 15, 22, 25, 71, 76, 79, 86, 87, 90, 98, 163, 165, 199 and 202; C. I. Direct Black 19, 22, 32, 38, 51, 56, 71, 74, 75, 77, 154, 168 and 171.

Examples of the basic dye include C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C. I. Basic Black 2 and 8.

Examples of the reactive dye include C. I. Reactive Black 3, 4, 7, 11, 12 and 17; C. I. Reactive Yellow 1, 5, 11, 13, 14, 20, 21, 22, 25, 40, 47, 51, 55, 65 and 67; C. I. Reactive Red 1, 14, 17, 25, 26, 32, 37, 44, 46, 55, 60, 66, 74, 79, 96 and 97; C. I. Reactive Blue 1, 2, 7, 14, 15, 23, 32, 35, 38, 41, 63, 80 and 95.

Examples of the pigment for a black ink include a carbon black. Examples of the pigment for a color ink include an anthraquinone pigment, a phthalocyanine blue, a phthalocyanine green, a diazo pigment, a monoazo pigment, a pyranthrone pigment, a perylene pigment, a heterocyclic yellow, a quinacridon pigment and a (thio) indigoid pigment.

Examples of the phthalocyanine blue include a copper phthalocyanine blue and a derivative thereof (e.g., a pigment blue 15). Examples of the quinacridon pigment include C.I. Pigment Orange 48 and 49, C.I. Pigment Red 122, 192, 202, 206, 207 and 209, C.I. Pigment Violet 19 and 42. Examples of the anthraquinone pigment include C.I. Pigment Red 43, 194 (perinone red), 216 (brominated pyranthrone red) and 226 (pyranthrone red).

Examples of the perylene pigment include C.I. Pigment Red 123 (vermilion), 149 (scarlet), 179 (maroon) and 190 (red), C.I. Pigment Violet and C.I. Pigment Red 189 (yellow shade red) and 224. Examples of the thio indigoid include C.I. Pigment Red 86, 87, 88, 181 and 198 and C.I. Pigment Violet 36 and 38. Examples of the heterocyclic yellow include C.I. Pigment Yellow 117 and 138. Examples of the other proper coloring pigments include pigments described in the literature "The Color Index, the third edition (edited by The Society of Dyers and Colorists, 1982)". When the pigment is used as a colorant, for complementing or toning the color, the above-noted dye may be used in combination with the pigment.

For the black pigment ink, a self-dispersible pigment which can be stably dispersed without using a dispersant having at least one hydrophilic group bonded to the surface of a carbon black directly or through another atom group, is preferably used. Therefore, in comparison with a conventional ink, a dispersant for dispersing the carbon black in the ink is not necessary. The self-dispersible carbon black has preferably an ionity and preferred examples thereof include that charged anionically and that charged cationically.

Examples of the anionic hydrophilic group include —COOM, —SO$_3$M, —PO$_3$HM, —PO$_3$M$_2$-SO$_2$NH$_2$ and —SO$_2$NHCOR, wherein M represents a hydrogen atom, an alkali metal, an ammonium ion and an organic ammonium ion and R represents a C$_1$ to C$_{12}$ alkyl group, a phenyl group which may have a substituent or a naphthyl group which may have a substituent. For the color pigment ink, a color pigment having —COOM or —SO₃M among the above-noted anionic hydrophilic groups which is bonded to the surface of the color pigment, is preferably used.

Examples of "M" in the above noted hydrophilic group include, as a metal, lithium, sodium and potassium and, as an organic ammonium, a mono or trimethyl ammonium, a mono or triethyl ammonium and a mono or trimethanol ammonium. Examples of the method for obtaining the above-noted anionically charged color pigment, as a method for introducing —COONa group to the surface of the color pigment, include a method for subjecting the color pigment to an oxidation using sodium hypochlorite, a method for sulfonating the color pigment and a method for reacting the color pigment with a diazonium salt.

As the cationic hydrophilic group, a quaternary ammonium group is preferred and any one of the below-noted quaternary ammonium groups is more preferred. According to the present invention, a colorant in which any one of these quaternary ammonium groups is bonded to the surface of the carbon black is preferably used.

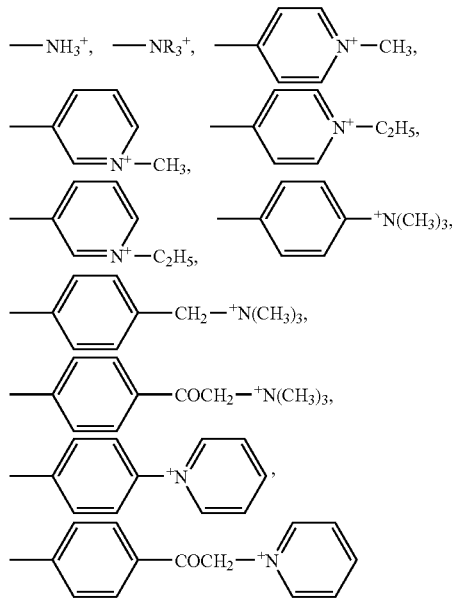

The method for producing a cationically-charged self-dispersible carbon black in which the hydrophilic group is bonded is not restricted and may be properly selected depending on the application. Examples of the method for producing the above-noted carbon black include, as a method for bonding a N-ethylpyridyl group represented by the following formula to the carbon black, a method for subjecting the carbon black to a treatment using 3-amino-N-ethylpyridium bromide.

According to the present invention, the carbon black may be a carbon black having the above-noted hydrophilic group bonded to the surface of the carbon black through another atom group. Examples of the other atom group include a $C_1$ to $C_{12}$ alkyl group, a phenyl group which may have a substituent and a naphthyl group which may have a substituent. Specific examples of the above-noted hydrophilic group bonded to the surface of the carbon black through another atom group include —$C_2H_4$COOM (, wherein M represents an alkali metal or a quaternary ammonium), —PhSO₃M (, wherein Ph represents a phenyl group, M represents an alkali metal or a quaternary ammonium) and —$C_5H_{10}NH^{3+}$, which should not be construed as limiting the scope of the present invention.

The amount of the colorant in the recording ink is preferably 0.5%, by mass to 25% by mass, more preferably from 2% by mass to 15% by mass. Generally, the higher the concentration of the colorant is, the higher the image density is and the higher the image quality is; however, when the concentration of the colorant is too high, the reliabilities in the inkjet process, such as the fixing properties, delivery stability and clogging resistance of the recording ink are sometimes adversely affected.

With respect to the recording ink according to the present invention, water is used as a carrier medium. For the object of obtaining desired properties of the ink, preventing the drying of the ink or improving the dispersion stability, for example, the below-noted water-soluble organic solvent are used. These water-soluble organic solvent may be used in combination.

Examples of the water-soluble organic solvent include a polyalcohol alkyl ether, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; a polyalcohol aryl ether, such as ethylene glycol monophenyl ether and ethylene glycol monobenzyl ether; a heterocyclic compound containing nitrogen (a lactam), such as 2-pyrrolidone, N-methyl-2-pyrrolidone, N-hydroxyethyl-2-pyrrolidone, 1,3-dimethylimidazolinone, ε-caprolactam and γ-butylolactone; an amide, such as formamide, N-methylformamide and N,N-dimethylformamide; an amine, such as monoethanolamine, diethanolamine, triethanolamine, monoethylamine, diethylamine and triethylamine; a compound containing sulfur, such as dimethylsufoxide, sulforan and thiodiethanol; propylene carbonate; and ethylene carbonate.

Among them, most preferred are thiodiethanolamine, polyethyleneglycol (200 to 600), 1,2,6-hexatriol, 1,2,4-butanetriol, 2-pyrrolidone and N-methyl-2-pyrrolidone. By using these organic solvents, an excellent effect for preventing the poor solubility of the colorant in a carrier medium and preventing the impaired injection properties of the ink due to the evaporation of the water in the ink can be obtained.

The recording ink according to the present invention may optionally comprise ureas or alkyl glycine. Examples of the ureas include urea, thiourea, ethylene urea and 1,3-dimethyl-2-imidazolidinone. Examples of the alkyl glycine include N-methyl glycine, N,N-dimethyl glycine and N-ethyl glycine. These ureas and alkyl glycines, basically in the aqueous ink, can maintain the excellent moisture retention of the ink (which leads to the improvement of the shelf stability of the ink) and can exhibit the excellent effect for the delivery stability and clogging resistance of the recording head of the inkjet printer. These compounds can widely cope with controlling the viscosity and surface tension of the ink and the recording head of the printer is excellent in the clogging resistance, so that the clogging of the head and the delivery defect of the ink, such as an irregular ejection of the ink drop can be prevented during the ink delivery.

Generally, the amount of the ureas or alkyl glycine in the ink is 0.5% by mass to 50% by mass, preferably 1% by mass to 20% by mass. When the amount is less than 0.5% by mass, desired properties of the recording head of the inkjet printer cannot be satisfied sometimes. On the other hand, when the amount is more than 50% by mass, the thickening of the ink is caused and the shelf stability of the ink is adversely affected, so that the delivery defect of the ink is caused.

—Surfactant—

Examples of the surfactant include an anionic surfactant, a nonionic surfactant, an amphoteric surfactant and a surfactant containing fluorine. According to the present invention, a surfactant which doesn't impair the dispersion stability of the ink in the combination of the surfactant with the colorant, the wetting agent or the water-soluble organic solvent is preferably selected. These surfactants may be used individually or in combination.

The surfactant containing fluorine is preferably a surfactant represented by the following formula.

$$CF_3CF_2(CF_2CF_2)_m\text{—}CH_2CH_2O(CH_2CH_2O)_nH \qquad \text{Formula (I)}$$

wherein "m" is an integer of 0 to 10 and "n" is an integer of 1 to 40.

Examples of the surfactant containing fluorine include a perfluoroalkyl sulfonate, a perfluoroalkyl carbonate, a perfluoroalkyl phosphate, a perfluoroalkyl ethyleneoxide adduct, a perfluoroalkyl betain and a perfluoroalkylamine oxide compound.

Examples of a commercially available surfactant containing fluorine include SURFLON S-111, S-112, S-113, S-121, S-131, S-132, S-141, S-145 (manufactured and sold by Asahi Glass Co., Ltd.), FLUORAD FC-93, FC-95, FC-98, FC-129, FC-135, FC-170C, FC-430, FC-431, FC-4430 (manufactured and sold by Sumitomo 3M Limited), MEGAFACE F-470, F-1405, F-474 (manufactured and sold by Dainippon Ink & Chemicals Inc.), ZONYL FS-300, FSN, FSN-100, FSO (manufactured and sold by DuPont Kabushiki Kaisha), EFTOP EF-351, EF-352, EF-801, EF-802 (manufactured and sold by JEMCO Inc.). Among them, ZONYL FS-300, FSN, FSN-100, FSO (manufactured and sold by DuPont Kabushiki Kaisha) which are advantageous in the reliability and improving the color development, can be preferably used.

The above-noted anionic surfactant, nonionic surfactant and amphoteric surfactant are preferably at least one selected from the group consisting of surfactants represented by the following formulae (II) to (X):

$$R^1\text{—}O\text{—}(CH_2CH_2O)_hCH_2COOM \qquad \text{Formula (II)}$$

wherein $R^1$ represents an alkyl group; M represents any one of an alkali metal ion, a quaternary ammonium ion, a quaternary phosphonium ion and an alkanolamine; and h is an integer of 3 to 12,

Formula (III)

wherein $R^2$ represents an alkyl group and M represents any one of an alkali metal ion, a quaternary ammonium ion, a quaternary phosphonium ion and an alkanolamine ion,

Formula (IV)

wherein $R^3$ represents a hydrocarbon group and k is an integer of 5 to 20, $$R^4\text{—}(OCH_2CH_2)_jOH \qquad \text{Formula (V)}$$

wherein $R^4$ represents a hydrocarbon group and j is an integer of 5 to 20,

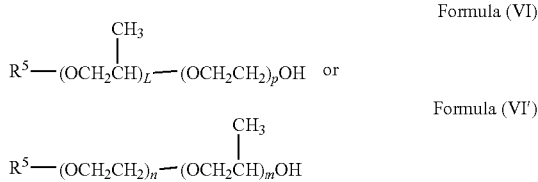

wherein $R^5$ represents a hydrocarbon group and L, m, n and p are individually an integer of 1 to 20,

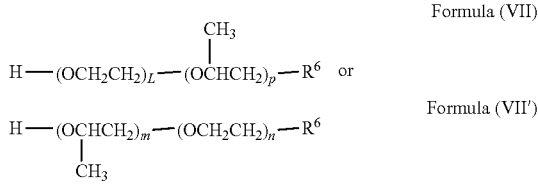

wherein $R^6$ represents a hydrocarbon group and L, m, n and p are individually an integer of 1 to 20,

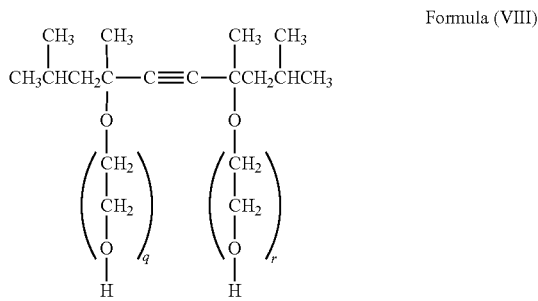

wherein q and r are individually an integer of 0 to 40,

wherein $R^7$ and $R^8$ represent an alkyl group or a hydroxyalkyl group and $R^9$ represents an alkyl group or an alkenyl group,

wherein $R^{10}$ and $R^{11}$ represent an alkyl group or a hydroxyalkyl group and $R^{12}$ represents an alkyl group.

Examples of the anionic surfactant include a polyoxyethylene alkyl ether acetate salt, a dodecylbenzene sulfonate salt, a laurylate salt and a polyoxyethylene alkyl ether sulfonate salt.

Examples of the nonionic surfactant include a polyoxyethylene alkyl ether, a polyoxypropylene oxyethylene alkyl ether, a polyoxyethylene alkyl ester, a polyoxyethylene sorbitan fatty acid ester a polyoxyethylene alkyl phenyl ether, a polyoxyethylene alkyl amine and a polyethylene alkyl amide.

Examples of the ampholytic surfactant include a laurylamino propionate, a lauryldimethyl betaine, a stearyldimethyl betaine, and a lauryldihydroxyethyl betaine. Specific examples of the ampholytic surfactant include a lauryldimethylamine oxide, a myristyldimethylamine oxide, a stearyldimethylamine oxide, a dihydroxyethyl laurylamine oxide, a polyoxyethylene coconut oil alkyldimethylamine oxide, a dimethylalkyl coconut oil betaine and a dimethyllauryl betaine.

Examples of the acetylene glycol surfactant include a 2,4,7,9-tetramethyl-5-decine-4,7-diol, 3,6-dimethyl-4-octine-3,6-diol and 3,5-dimethyl-1-hexine-3-ol (commercially available examples of the acetylene glycol surfactant include Surfynol 104, 82, 465, 485 and TG (manufactured and sold by Air Products and Chemicals, Inc., U.S.A.)). Particularly, when Surfynol 465, 104 or TG is used for producing the recording ink, the recording ink exhibits an advantageous printing quality.

The recording ink according to the present invention comprises preferably a $C_8$ to $C_{11}$ polyol compound or a glycol ether compound. These compounds have preferably a solubility in water at 25° C. of in the range of from 0.1% by mass or more to less than 4.5% by mass.

Examples of the $C_8$ to $C_{11}$ polyol compound include 2-ethyl-1,3-hexanediol (having a solubility at 25° C. of 4.2% by mass) and 2,2,4-trimethyl-1,3-pentanediol (having a solubility at 25° C. of 2.0% by mass).

Example of the glycol ether compound include a polyalcohol alkyl ether, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; and a polyalcohol aryl ether, such as ethylene glycol monophenyl ether and ethylene glycol monobenzyl ether.

The amount of the $C_8$ to $C_{11}$ polyol compound or glycol ether compound is preferably 0.1% by mass to 10.0% by mass, based on the total mass of the recording ink. When the amount is in this preferred range, the wetting properties of the ink to the heat element is improved and with the small amount of the compound, the delivery stability and frequency stability of the ink can be obtained.

The above-noted other components are not restricted and may be properly selected depending on the necessity. Examples of the other components include a resin emulsion, a pH controlling agent, an antiseptic and anti-fungus agent, an anticorrosion agent, an antioxidant, an ultraviolet-absorbing agent, an oxygen-absorbing agent and a light stabilizer.

The ink according to the present invention comprises preferably a resin emulsion. The amount of a resin composition in the resin emulsion is preferably 0.1% by mass to 40% by mass, more preferably 0.1% by mass to 25% by mass, based on the total mass of the ink.

The resin emulsion has a tendency to be thickened or agglomerated and has the effect of suppressing the penetration of the colorant component into the recording medium and promoting the fixation of the colorant component on the surface of the recording medium. Some types of the resin emulsion form a film on the surface of the recording medium, so that such types have the effect of improving the resistance to scuffing of the printed matter.

According to a preferred aspect of the present invention, the resin is preferably a polymer having both a hydrophilic portion and a hydrophobic portion. The diameter of the resin component is not restricted so long as the resin component forms the emulsion and may be properly selected depending on the application. The diameter is preferably 150 nm or less, more preferably 5 nm to 10 nm.

The resin emulsion can be obtained by mixing the resin particles, optionally together with a surfactant with water.

For example, an emulsion of an acrylic resin or an emulsion of styrene-an acrylic resin can be obtained by mixing a (meth)acrylate and a (meth)acrylate and optionally together with a surfactant with water or by mixing styrene and a (meth)acrylate and optionally together with a surfactant with water.

Usually, the mixing ratio between the resin component and the surfactant is preferably 10:1 to 5:1. When the amount of the surfactant is less than the lower limit of the above-noted range, the emulsion cannot be satisfactorily formed. On the other hand, when the amount of the surfactant is more than the upper limit of the above-noted range, a disadvantage is likely to be caused wherein the water resistance of the ink is likely to be lowered and the penetration properties of the ink is adversely affected.

The mixing ratio of the water to the resin as the component of the disperse phase is preferably 60 parts by mass 400 parts by mass, more preferably 100 parts by mass to 200 parts by mass, relative to 100 parts by mass of the resin.

Examples of the commercially available resin emulsion include a styrene-acrylic resin emulsion (manufactured and sold by Nippon Paint Co., Ltd.; trade name: Micro gel E-1002, E-5002), an acrylic resin emulsion (manufactured and sold by Dai Nippon Ink and Chemicals Inc.; trade name: Boncoat 4001), a styrene-acrylic resin emulsion (manufactured and sold by Dai Nippon Ink and Chemicals Inc.; trade name: Boncoat 5454), a styrene-acrylic resin emulsion (manufactured and sold by Nippon Zeon Corp.; trade name: SAE-1014) and an acrylic resin emulsion (manufactured and sold by Saiden Chemical Industry Co., Ltd.; trade name: Saivinol SK-200).

Examples of the antiseptic or anti-fungus agent include sodium dehydroacetate, sodium sorbate, 2-pyridinethiol-1-oxide sodium, sodium benzoate, pentachlorophenol sodium and 1,2-benzisothiazoline-3-on. Among them, particularly 1,2-benzisothiazoline-3-on is preferably used.

The pH controlling agent is not restricted so long as the agent can control the pH of the ink to 7 or more without adversely affecting the produced ink and may be properly selected depending on the application.

Examples of the pH controlling agent include an amine, such as diethanolamine and triethanolamine; a hydroxide of an alkali metal, such as lithium hydroxide, sodium hydroxide and potassium hydroxide; a hydroxide, such as ammonium hydroxide, quaternary ammonium hydroxide and quaternary phosphonium hydroxide; and a carbonate of an alkali metal, such as lithium carbonate, sodium carbonate and potassium carbonate. Among them, 2-amino-2-ethyl-1,3-propanediol is preferably used. This pH controlling agent is water-soluble and can be uniformly dissolved in an aqueous ink, so that this pH controlling agent does not affect adversely a colorant dispersed or dissolved in the aqueous ink. Further, this pH controlling agent has not only the function as a pH controlling agent, but also an extremely high effect for preventing the dissolution of the material for the inkjet head, when at least a part of the liquid space, fluid-resistance part, vibrating plate and nozzle member of the inkjet head is formed using a material comprising silicone or nickel, so that the extremely high effect for preventing the dissolution of the material for the inkjet head leads to a remarkable effect for the long-period reliability of the inkjet recording apparatus using an ink comprising this pH controlling agent (2-amino-2-ethyl-1,3-propanediol). Further, it was also clarified that this pH controlling agent has an extremely high effect for improving the delivery stability of the ink.

Examples of the anticorrosion agent include an acidic sulfite salt, sodium thiosulfate, ammonium thiodiglycolate, diisopropyl ammonium nitrite, pentaerythritol tetranitrate and dicyclohexylammonium nitrite.

Examples of the antioxidant agent include a phenol type antioxidant (e.g., a hindered phenol type antioxidant), an amine type antioxidant, a sulfur-containing antioxidant and a phosphor-containing antioxidant.

Examples of the phenol type antioxidant (including a hindered phenol type antioxidant) include butylated hydroxyanisole, 2,6-di-tert-butyl-4-ethylphenol, stearyl-β-(3,5-di-tert-butyl-4-hydroxyphenyl)propionate, 2,2'-methylenebis (4-ethyl-6-tert-butylphenol), 2,2'-methylenebis (4-methyl-6-tert-butylphenol), 4,4'-butylidenebis (3-methyl-6-tert-butylphenol), 3,9-bis[2-[3-(3-t-butyl-4-hydroxy-5-methylphenyl)-propyonyloxy]-1,1-dimethylethyl]-2,4,8,10-tetraoxyspiro[5,5]undecane, 1,1,3-tris (2-methyl-4-hydroxy-5-tert-butylphenyl)butane, 1,3,5-trimethyl-2,4,6-tris(3,5-di-tert-butyl-4-hydroxybenzyl)benzene and tetrakis[methylene-3-(3',5'-di-tert-butyl-4'-hydroxyphenyl) propionate] methane.

Examples of the amine type antioxidant include phenyl-β-naphthylamine, α-naphthylamine, N,N'-di-sec-butyl-p-phenylenediamine, phenothiazine, N,N'-diphenyl-p-phenilenediamine, 2,6-di-tert-butyl-p-cresol, 2,6-di-tert-butylphenol, 2,4-dimethyl-6-tert-butylphenol, butylhydroxyanisole, 2,2'-methylenebis (4-methyl-6-tert-butylphenol), 4,4'-butylidenebis (3-methyl-6-tert-butylphenol), tetraxis[methylene-3(3,5-di-tert-butyl-4-dihydroxyphenyl)propionate]methane and 1,1,3-tris(2-methyl-4-hydroxy-5-tert-butylphenyl)butane.

Examples of the sulfur-containing antioxidant include dilauryl-3,3'-thiodipropionate, distearyl-thiodipropionate, lauryl-stearyl-thiodipropionate, dimyristyl-3,3'-thiodipropionate, distearyl-β,β'-thiodipropionate, 2-mercapto-benzoimidazole and dilaurylsulfide.

Examples of the phosphor-containing antioxidant include triphenyl phosphate, octadecyl phosphate, triisodecyl phophite, trilauryl-trithio phosphate and trinonylphenyl phosphate.

Examples of the ultraviolet absorber include a benzophenone type ultraviolet absorber, a benzotriazole type ultraviolet absorber, a salicylate type ultraviolet absorber, a cyanoacrylate type ultraviolet absorber and a nickel complex salt type ultraviolet absorber.

Examples of the benzophenone type ultraviolet absorber include 2-hydroxy-4-n-octoxybenzophenone, 2-hydroxy-4-n-dodecyloxybenzophenone, 2-hydroxy-4-dihydroxybenzophenone, 2-hydroxy-4-methoxybenzophenone and 2,2',4,4'-tetrahydroxybenzophenone.

Examples of the benzotriazole type ultraviolet absorber include 2-(2'-hydroxy-5'-tert-octylphenyl)benzotriazole, 2-(2'-hydroxy-5'-tert-methylphenyl)benzotriazole, 2-(2'-hydroxy-4'-octoxyphenyl)benzotriazole and 2-(2'-hydroxy-3'-tert-butyl-5'-methylphenyl-5-chloro-benzotriazole.

Examples of the salicylate type ultraviolet absorber include phenyl salicylate, p-tert-butylphenyl salicylate and p-octylphenyl salicylate.

Examples of the cyanoacrylate type ultraviolet absorber include ethyl-2-cyano-3,3'-diphenyl acrylate, methyl-2-cyano-3-methyl-3-(p-methoxyphenyl)acrylate and butyl-2-cyano-3-methyl-3-(p-methoxyphenyl)acrylate.

Examples of the nickel complex salt type ultraviolet absorber include nickelbis(octylphenyl)sulfide, 2,2'-thiobis (4-tert-octylphenolate)-n-butylamine nickel (II), 2,2'-thiobis (4-tert-octylphelate)-n-ethylhexylamine nickel (II) and 2,2'-thiobis (4-tert-octylphelate)-triethanolamine nickel (II).

The properties of the recording ink according to the present invention are not restricted and may be properly selected depending on the application. For example, it is preferred that the viscosity, the surface tension, the conductivity and the pH of the ink are respectively within the below-noted ranges.

The viscosity is preferably 5 mPa·sec to 20 mPa·sec, more preferably 5 mPa·sec to 10 mPa·sec, at 25° C. When the viscosity is more than 20 mPa·sec, it becomes sometimes difficult to maintain the delivery stability of the ink. On the other hand, when the viscosity is less than 5 mPa·sec, the delivery stability is lowered and a turbulent delivery is sometimes caused.

The surface tension is preferably 25 mN/m to 55 mN/m at 20° C. When the surface tension is less than 25 mN/m, exudation of the ink on the surface of the paper becomes markedly and a stable injection of the ink cannot be obtained sometimes. On the other hand, when the surface tension is more than 55 mN/m, the ink cannot satisfactorily penetrate into the paper and the drying of the ink takes much time.

The conductivity is preferably 0.5 S/m or less, more preferably 0.005 S/m to 0.4 S/m.

The pH is preferably 7 to 10.

The color of the recording ink according to the present invention is not restricted and may be properly selected depending on the application. Examples of the color of the ink include yellow, cyan, magenta and black. When an ink set containing two or more of these inks are used, an image in multi-color can be formed and when an ink set containing all of these inks is used, an image in full-color may be formed.

The recording ink according to the present invention can be advantageously used in any one of inkjet heads of such types as a piezo type in which using a piezoelectricity element as a pressure generating unit applying the pressure to the ink in the ink path, a vibrating plate forming the wall of the ink path is deformed and the volume of the ink path is changed, so that the ink drop is delivered (see JP-A No. 02-51734); a thermal type in which using a heating element having a high electrical resistance, the ink is heated in the ink path and a bubble is generated (JP-A No. 61-59911); and a static charge type in which by the static power generated between a vibrating plate and a electrode, a vibrating plate is deformed and the volume of the ink path is changed, so that the ink drop is delivered (see JP-A No. 06-71882).

The recording ink according to the present invention can be preferably used in various fields as follows. The recording ink can be so preferably used in an image forming apparatus (e.g., a printer) of an inkjet recording system that by heating the recording ink together with a paper for the recording at 50° C. to 200° C. during, before or after the printing, the recording ink can be used for a printer of an apparatus having the function of promoting the printing fixation. The recording ink can be particularly preferably used for the following ink cartridge, ink record, inkjet recording apparatus and inkjet recording process according to the present invention.

(Ink Cartridge)

The ink cartridge according to the present invention comprises a container and the recording ink according to the present invention which is capsulated in the container and optionally other members selected properly.

The container is not restricted and the form, structure, size and material thereof may be properly selected depending on the application. Preferred examples of the container include a container having at least an ink bag produced using an aluminum laminated film or a resin film.

With respect to an aspect of the ink cartridge according to the present invention, with referring to FIGs., explanations are given. The ink cartridge 1 shown in FIG. 1 comprises the ink bag 2 containing the recording ink and the housing containing the ink bag 2. The ink bag 2 has a flexible portion in the form of a rectangle-formed bag which is made of an aluminum laminated film and contains the recording ink according to the present invention which is filled in the inside of the bag. The housing 3 comprises the first housing 11, the second housing 12 and the third housing 13. In the ink cartridge 1, the first housing 11 and the second housing 12 are fixed with the screw 82.

The ink cartridge according to the present invention contains the recording ink (ink set) according to the present invention and can be used in such a manner that the ink cartridge is installed in various inkjet recording apparatus in the attachable and detachable manner and is particularly preferably used in such a manner that the ink cartridge is installed in the below-noted inkjet recording apparatus according to the present invention.

(Inkjet Recording Apparatus and Inkjet Recording Process)

The inkjet recording apparatus according to the present invention comprises at least an ink ejecting unit and optionally other units selected properly, such as a stimulation generating unit and a controlling unit.

The inkjet recording process according to the present invention comprises at least ejecting the ink and optionally other steps selected properly, such as generating the stimulation and controlling.

The inkjet recording process according to the present invention is preferably performed using the inkjet recording apparatus according to the present invention and ejecting the ink is preferably performed using the ink ejecting unit according to the present invention. The other steps can be performed preferably using the other units —Ejecting Ink and Ink Ejecting Unit—

The ink ejecting unit is an unit recording the image by applying the stimulation to the recording ink according to the present invention for ejecting the recording ink. The ink ejecting unit is not restricted and examples thereof include various nozzles for delivering the ink.

According to the present invention, it is preferred that at least a part of the liquid space part, fluid resistance part, vibrating plate and nozzle of the inkjet head is produced using a material comprising at least one of silicone and nickel.

The inkjet nozzle has a diameter of preferably 30 μm or less, more preferably 1 μm to 20 μm.

The stimulation can be generated, for example by the above-noted stimulation generating unit. The stimulation is not restricted and may be properly selected depending on the application. Examples of the stimulation include a heat (temperature), a pressure, a vibration and a light. These stimulations may be used individually or in combination. Among them, the heat and the pressure are preferred.

Examples of the stimulation generating unit include a heating apparatus, a pressurizing apparatus, a piezoelectricity element, a vibration generating apparatus, an ultrasonic oscillating machine and a light. Specific examples of the stimulation generating unit include a piezoelectricity actuator, such as a piezoelectricity element, a thermal actuator utilizing the phase change caused by the film boiling of the liquid which is generated using a electricity-heat exchange element, such as a heating element having a high electrical resistance, an actuator of a shape memory alloy utilizing the phase change of a metal due to the change of the temperature and a static actuator utilizing the static power.

The aspect of ejecting the recording ink is not restricted and varies depending on the type of the stimulation as follows. For example, when the stimulation is "heat", the aspect is a method in which by applying a thermal energy corresponding to a recording signal to the recording ink in the recording head using, for example a thermal head, a bubble is generated in the recording ink by the applied thermal energy and by the pressure of the generated bubble, the recording ink is delivered and injected as a liquid drop through a nozzle pore of the recording head. When the stimulation is a pressure, an aspect is a method in which by applying a voltage to a piezoelectricity element installed at the so-called pressure space in the ink path of the recording head, the piezoelectricity element is made flex and the volume of the pressure space is decreased, so that the recording ink is delivered and injected as a liquid drop through a nozzle pore of the recording head.

The size of the liquid drop of the ejected recording ink is preferably 3 pl to 40 pl. The speed of the deliver injecting of the recording ink is preferably 5 m/sec to 20 m/sec. The driving frequency thereof is preferably 1 kHz or more and the resolution thereof is preferably 300 dpi or more.

The controlling unit is not restricted so long as the unit can control the action of the above-noted units and may be properly selected depending on the application. Examples of the controlling unit include a sequencer and a computer.

With respect to an aspect for embodying the inkjet recording process according to the present invention using the inkjet recording apparatus according to the present invention, with referring to FIGs., explanations are given. The inkjet recording apparatus shown in FIG. 2 comprises the main body 101, the paper feeding tray 102 attached to the main body 101, the paper discharging tray 103 attached to the main body 101 in which the paper on which the image is recorded is stocked and the ink cartridge loading part 104. On the upper surface of the ink cartridge loading part 104, the operation part 105 comprising an operation key and a display instrument is disposed. The ink cartridge loading part 104 has the front cover 115 which can be opened and shut for attaching and detaching the ink cartridge 1.

Figure 3:
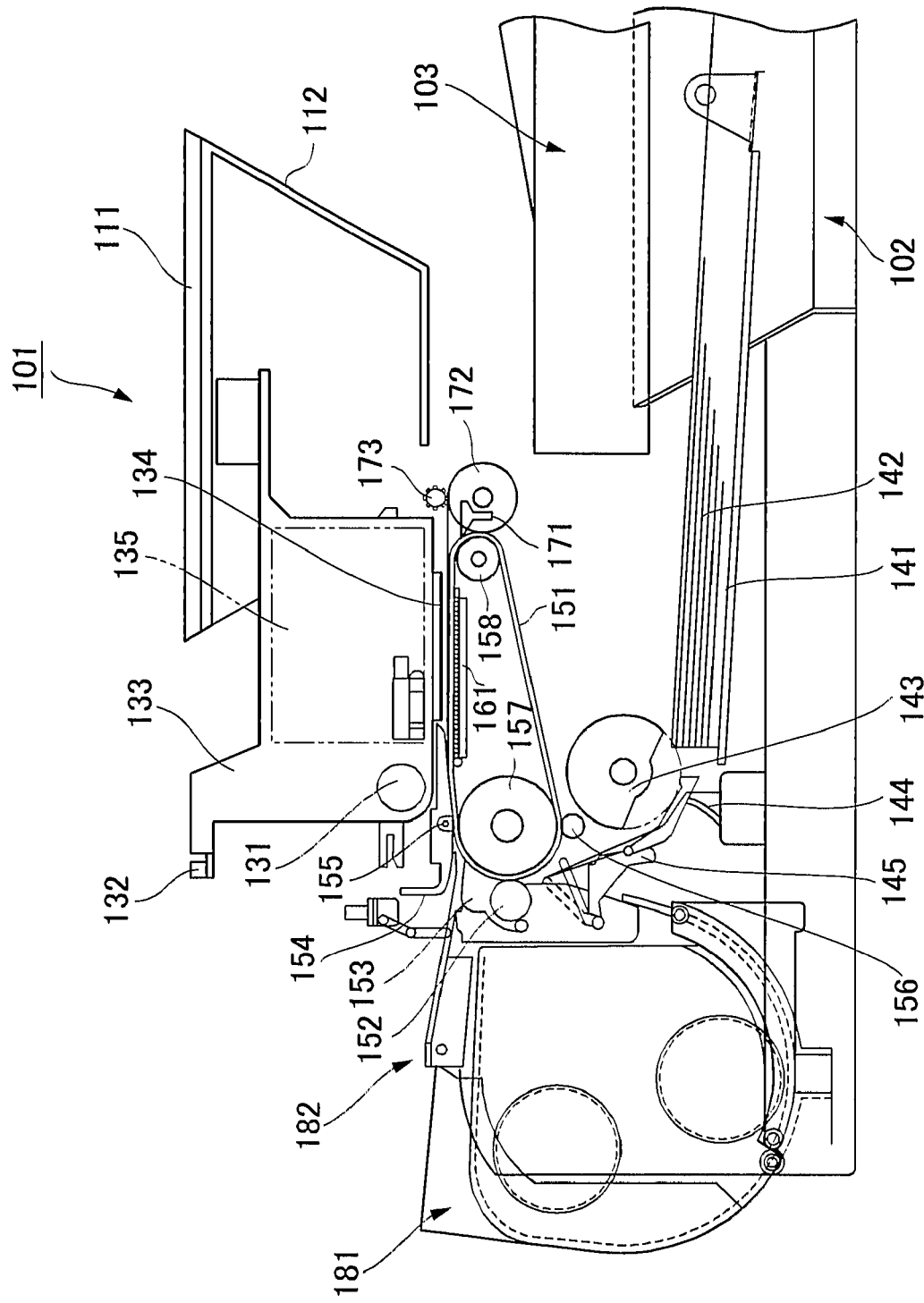
FIG. 3 is an explanatory view schematically showing an example of an inner structure of the inkjet recording apparatus shown in FIG. 2.
Figure 4:
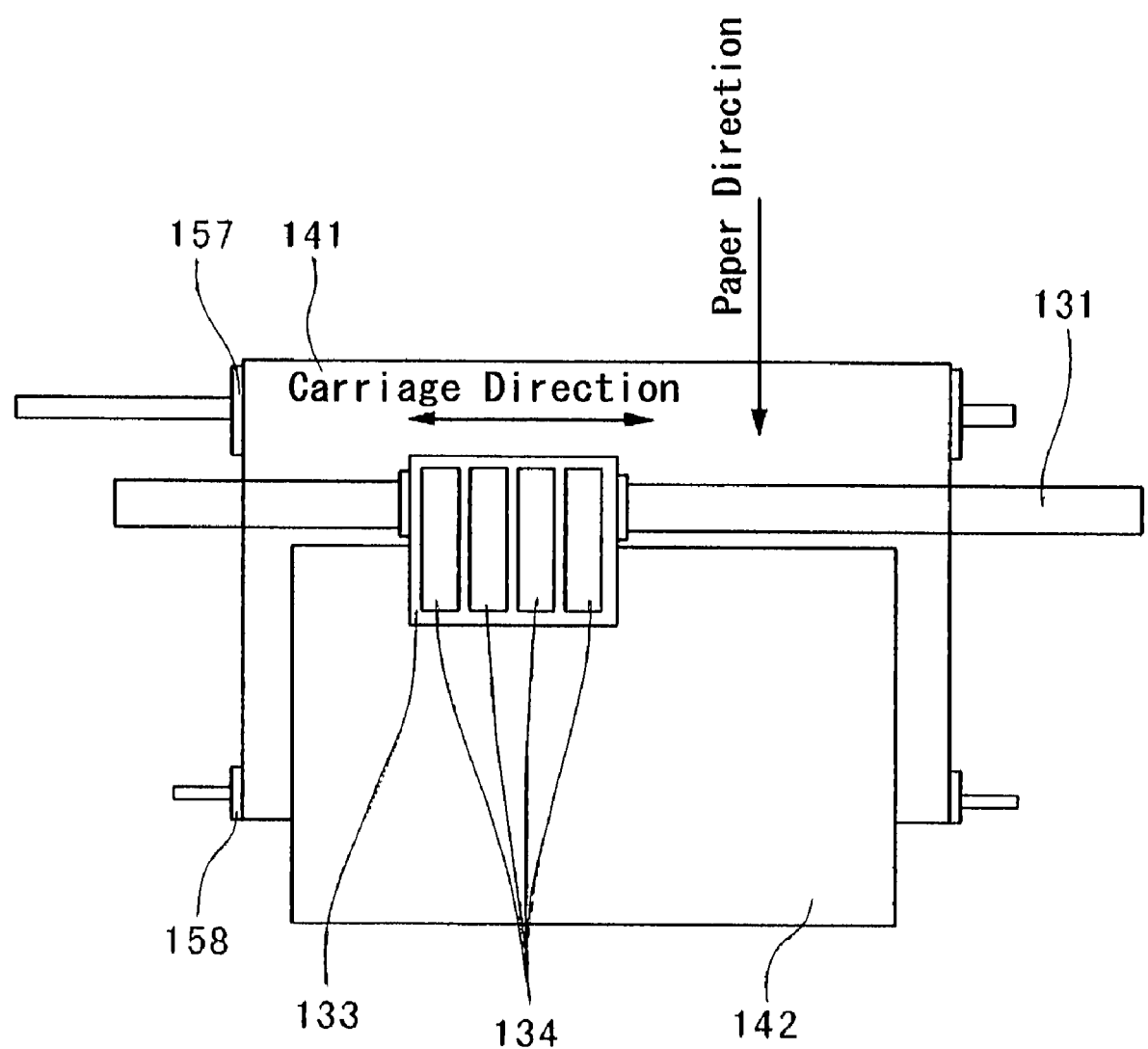
FIG. 4 is a plan view schematically showing an inner part of the inkjet recording apparatus shown in FIG. 2.

In the main body 101, as shown in FIG. 3 and FIG. 4, the carriage 133 is supported by the guide rod 131 and the stay 132 which are laid across the right and left side walls (not illustrated in FIGs.) of the main body in such a manner that the carriage 133 can be scanned flexibly in the main scanning direction and the carriage 133 is moved and scanned by a main scanning motor (not illustrated in FIGs.) in the direction indicated by the arrow in FIG. 4.

To the carriage 133, the recording head 134 comprising four heads for the inkjet recording which deliver respectively the recording ink drop of yellow (Y), cyan (C), magenta (M) and black (B) is attached in such a manner that plural ink delivery outlets are oriented in the direction crossing the main scanning direction and the direction of the ink-drop delivery is downwards.

As an inkjet recording head consisting the recording head 134, a piezoelectricity actuator, such as a piezoelectricity element, a thermal actuator utilizing the phase change caused by the film boiling of the liquid which is generated using a electricity-heat exchange element, such as a heating element having a high electrical resistance, an actuator of a shape memory alloy utilizing the phase change of a metal due to the change of the temperature and a head equipped with a static actuator utilizing the static power as an energy generating unit for delivering the recording ink, can be used.

The carriage 133 is also equipped with the sub-tank 135 of each color for supplying the ink of each color to the recording head 134. Into the sub-tank 135, the recording ink according to the present invention is supplied and supplemented from the ink cartridge 1 according to the present invention which is loaded in the ink cartridge loading part 105 through a supplying tube (not illustrated in FIGs.).

On the other hand, the paper feeding part for feeding the paper 142 which is piled up on the paper loading part 141 (pressure plate) in the paper feeding tray 102 comprises the semicircular roller (the paper feeding roller 143) feeding the paper 142 one by one separately from the paper loading part 141 and the separating pad 144 made of a material having a large friction coefficient, wherein the separating pad 144 is biased to the paper feeding roller 143.

The paper conveying part for conveying the paper 142 fed from the paper feeding part in the part beneath the recording head 134 comprises the conveying belt 151 for conveying the paper 142 by adsorbing the paper 142 statically, the counter roller 152 for conveying the paper 142 conveyed from the paper feeding part through the guide 145 by holding the paper 142 between the conveying belt 151 and the counter roller 152, the conveying guide 153 for changing the conveying direction of the paper 142 which is conveyed perpendicular upwards by 90° to convey the paper 142 onto the conveying belt 151, the pressing member 154, the top-pressing roller 155 biased to the conveying belt 151 by the pressing member 154 and the charging roller 156 which is a charging unit for charging the surface of the conveying belt 151.

The conveying belt 151 is an endless belt, is hung between the conveying roller 157 and the tension roller 158 and can be rotated in the direction of conveying the paper 142. On the reverse surface of the conveying belt 151, the guide member 161 is disposed corresponding to the printing area by the recording head 134. The paper discharging part for discharging the paper 142 recorded by the recording head 134 comprises the peeling nail 171 for peeling the paper 142 from the conveying belt 151, the paper discharging roller 172 and the paper discharging roller 173, wherein the paper discharging tray is disposed under the paper discharging roller 172.

In the rear part of the main body 101, the both-surface paper feeding unit 181 is installed in an attachable and detachable manner. The both-surface paper feeding unit 181 receives the paper 142 which is back-conveyed by the reverse rotating of the conveying belt 151 and reverses the conveying direction of the paper 142, thereby feeding the paper 142 between the counter roller 152 and the conveying belt 151. Above the both-surface paper feeding unit 181, the manual paper feeding part is installed.

In the inkjet recording apparatus, the paper 142 is fed one by one separately and upwards perpendicularly from the paper feeding part and conveyed between the conveying roller 151 and the counter roller 152 according to the guidance of the guide 145. Further, the top of the paper 142 is guided by the conveying guide 153, is pressed to the conveying belt 151 by the top-pressing roller 155 and the conveying direction of the paper 142 is changed by 90° C.

At this time, the paper 142 is adsorbed statically to the conveying belt 151 charged by the charging roller 156 and conveyed. Here, by driving the recording head 134 according to the image signal with moving the carriage 133, the stopped paper 142 is recorded in an amount of one line with the delivered ink drop and after the paper 142 is conveyed in a specified amount, the paper 142 is recorded from the next line. By receiving the signal for the recording completion or the signal for the reaching of the bottom of the paper 142 at the recording region, the recording action is stopped and the paper 142 is discharged into the discharging tray 103.

When the signal indicating that a remaining amount of the recording ink in the sub-tank 135 is almost 0 is detected, a required amount of the recording ink is supplemented from the ink cartridge 1 into the sub-tank 135.

In the inkjet recording apparatus according to the present invention, when the recording ink in the ink cartridge 1 is used up, only the ink bag 2 can be exchanged by disassembling the housing 3 of the ink cartridge 1. The ink cartridge 1 not only can supply stably the recording ink, but also is upright and can be exchanged at the front of the main body 101. Therefore, when the space above the main body 101 is occupied, for example, when the main body 101 is contained in a lack or when a matter is put on the upper surface of the main body 101, the ink cartridge 1 is easily exchanged.

Here, explanations are given with respect to an example of the present invention applied to an inkjet recording apparatus of the serial type (the shuttle type) in which the carriage is scanned. However, the present invention can be also applied to an inkjet recording apparatus of the line type equipped with a line type head.

The inkjet recording apparatus and inkjet recording process according to the present invention can be applied to various records according to the inkjet recording system. Examples of the apparatus to which the inkjet recording apparatus and inkjet recording process according to the present invention can be particularly preferably applied include an inkjet recording printer, a facsimile apparatus, a copy apparatus and a printer/facsimile/copier composite apparatus.

Hereinbelow, with respect to the inkjet head to which the present invention is applied, explanations are given.

Figure 5:
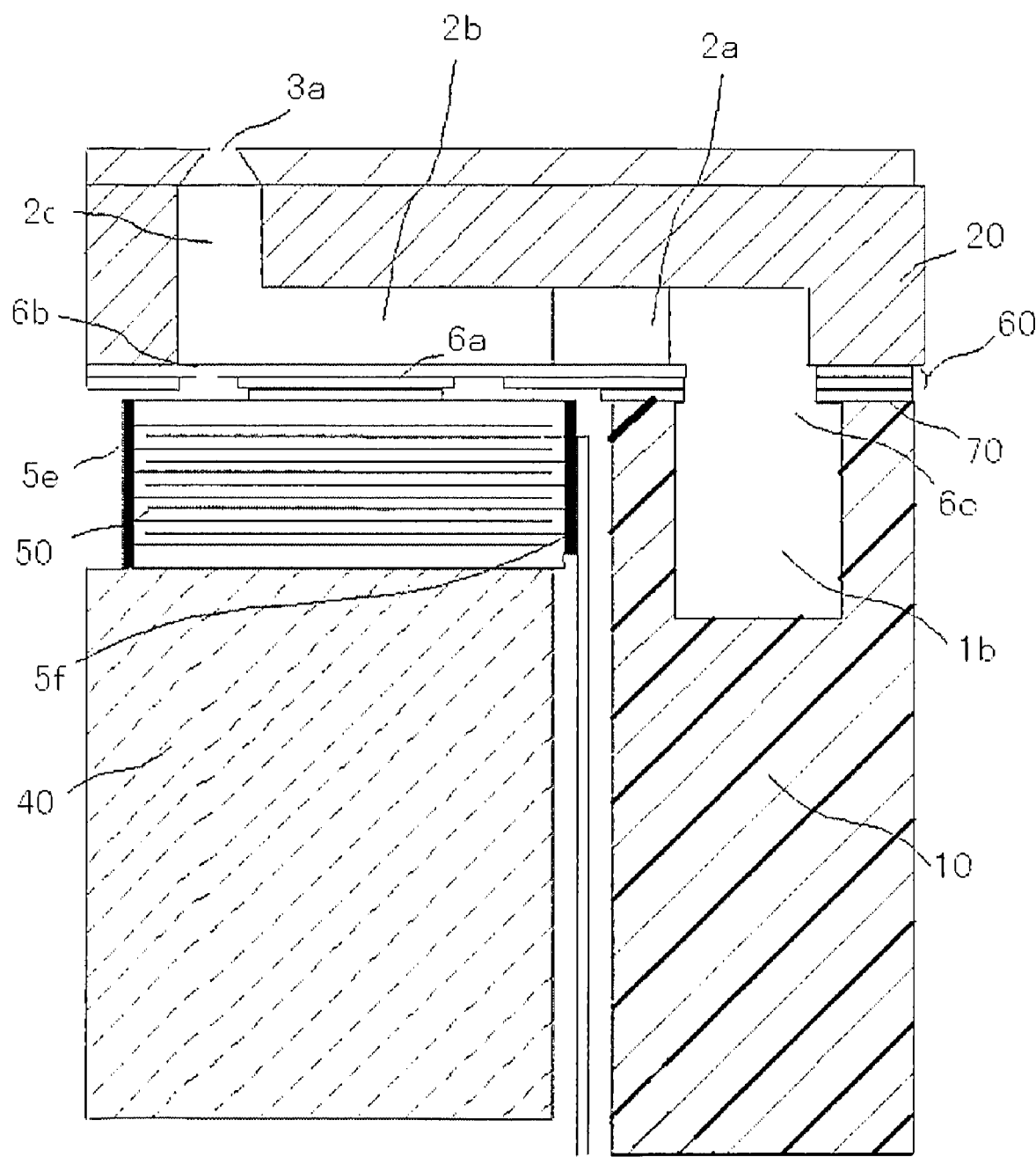
FIG. 5 is an element-enlarged view schematically showing an example of an inkjet head according to the present invention.
Figure 6:
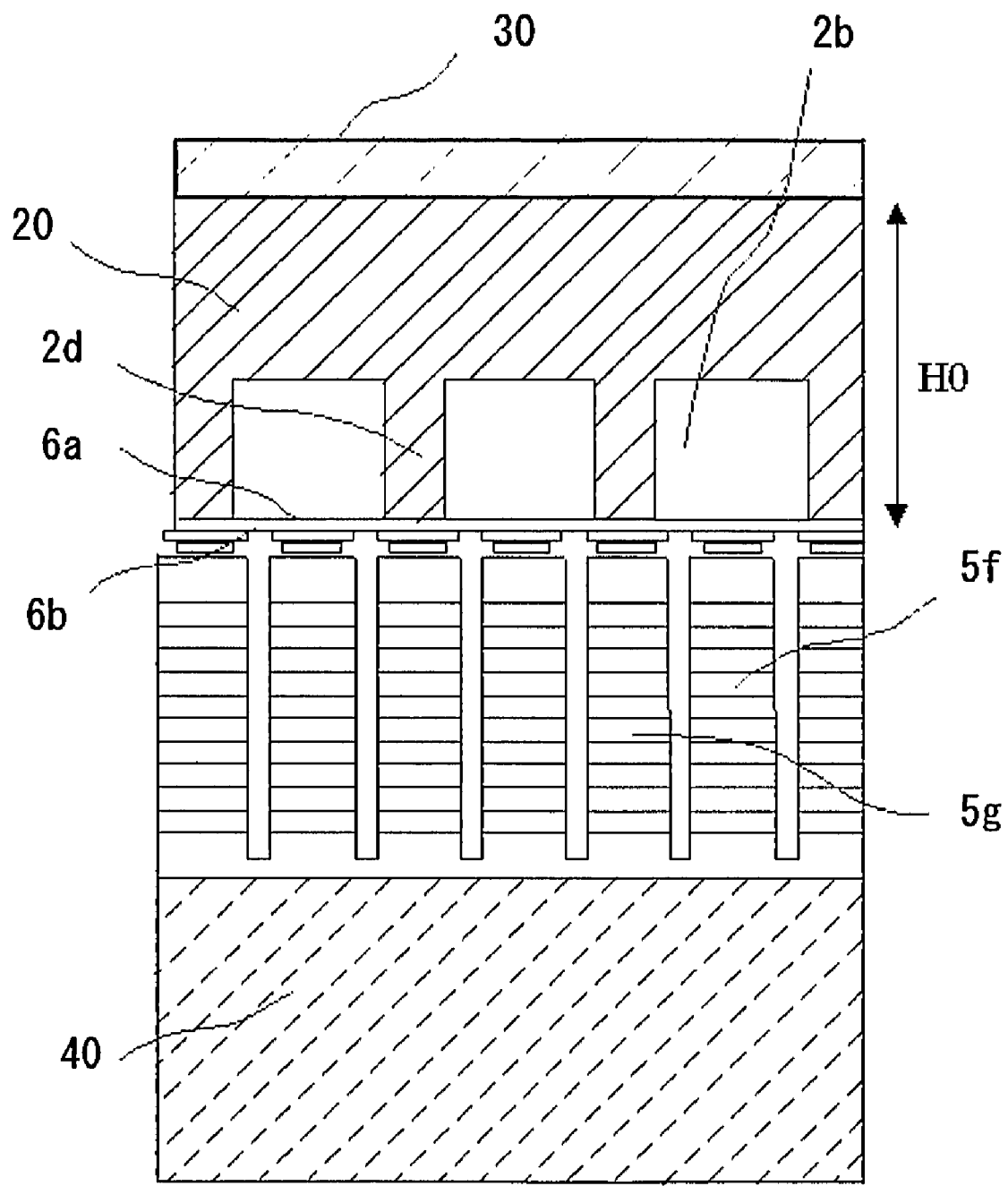
FIG. 6 is an element-enlarged sectional view schematically showing an example of an inkjet head according to the present invention.

FIG. 5 is an element-enlarged view schematically showing an example of the inkjet head according to one embodied aspect of the present invention. FIG. 6 is an element-enlarged sectional view schematically showing a part of the head shown in FIG. 5 in the inter-channel direction.

The inkjet head comprises the frame 10 in which a carving is formed, wherein the carving consists of the ink supplying inlet (not illustrated in FIG. 5) and the common liquid space 1b, the ink path plate 20 in which a carving and the leading outlet 2 c which leads the ink path to the nozzle 3 a are formed wherein the carving consists of the fluid resistance part 2 a and the pressed-liquid space 2 b, a nozzle plate forming the nozzle 3 a, the vibrating plate 60 comprising the convex part 6 a, the diaphragm part 6 b and the ink inlet 6 c, the laminated piezoelectricity element 50 connected through the adhesive layer 70 with the vibrating plate 60 and the base 40 fixing the laminated piezoelectricity element 50.

The base 40 is produced using a ceramic of the barium titanate type and on the base, two rows of the laminated piezoelectricity element 50 are fixed.

In the laminated piezoelectricity element 50, piezoelectricity layers comprising one layer of Plumb Zirconate Titanate (PZT) having a thickness of 10 μm to 50 μm and internal electrode layers comprising one layer of Ag.Pd having a thickness of several μm are laminated alternatively. The internal electrode is connected at the both ends with the external electrode.

The laminated piezoelectricity element 50 is divided into individual electrodes in the shape of the comb by the dicing process of the half-cut and each element is used as a driven part 5 *f* or a supporting part 5 *g* (undriven part). The outer part of the external electrode is also divided by the dicing process of the half-cut into plural individual electrodes so that the length of each electrode is limited by a process, such as notching. The inner part of the external electrode is not divided and is conductive as the common electrode.

To the individual electrode of the driven part 5 *f*, FPC 8 is bonded by the soldering. On the other hand, the common electrode is connected through an electrode layer disposed on the terminal of the laminated piezoelectricity element with the Gnd. electrode of FPC 8. To FPC 8, the driver IC (not illustrated in FIG. 5) is packaged and by the driver IC, the applying of a driving voltage to the driven part 5*f* is controlled.

The vibration plate 60 comprises the thin-film diaphragm part 6 *b*, the island-shaped convex part 6 *a* (island part) which is formed in the central part of the diaphragm part 6 *b* and is bonded to the laminated piezoelectricity element 50 comprising the driving part 5 *f* and the supporting part 5 *g*, a thick film part comprising a beam, which is bonded to the supporting part 5 *g*, and the ink inlet 6 *c* which is formed using two Ni plating films produced by the electro forming method. The diaphragm part 6 *b* has a thickness of 3 μm and a width of 35 μm (one side).

The bonding between the island-shaped convex part 6 *a* of the vibrating plate 60 and the driven part 5 *f* of the laminated piezoelectricity element 50 and the bonding between the vibrating plate 50 and the frame 10 are performed by adhesive-bonding through the patterning of the adhesive layer 70 comprising a gap material.

In the ink path plate 20 made of a silicone-single crystal substrate, the carving consisting of the fluid resistance part 2 *a* and the pressed-liquid space 2 *b* and the leading outlet 2 *c* which leads the ink path to the nozzle 3 *a* are formed by patterning according to an etching method.

In the patterning, the part of the ink path plate 20 which is not etched is the partition 2 *d* between two pressed-liquid spaces 2 *b*. In this recording head, a part having a narrow etching width is formed as the fluid resistance part 2 *a*.

The nozzle plate 30 is produced using a metal material, such as a Ni plating film produced by the electro forming method and in the nozzle plate 30, many nozzles 3 *a* which are fine delivery outlets for ejecting the ink drop are formed. The shape of the inside of the nozzle 3 *a* is a shape of the horn (it may be also a shape of the column or a shape of the conical). The nozzle 3 *a* has a diameter of 20 μm to 35 μm at the top of the nozzle 3 *a* and the pitch of the nozzle 3 *a* is 150 dpi.

In the surface of the nozzle plate 30 (on which many openings of the nozzle 3 *a* are formed), the water-repellant treated layer 3 *b* (not illustrated) of which surface is rendered to be water repellant is disposed. The water-repellant treated layer 3 *b* is produced as a no water-repellant treated layer produced according to a method selected depending on properties of the ink from methods, such as a PTFE-Ni eutectoid plating, an electro painting using a fluorine resin, a metallizing-coating using a volatile fluorine resin (e.g., a fluorinated pitch) and a baking after the applying of a silicone type resin or a fluorine type resin to the surface so that the form of the ink drop and ejecting properties of the ink cam be stabilized and a high image quality can be obtained. Among them, by metallizing-coating using a modified perfluoropolyoxethane (manufactured and sold by Daikin Industries, Ltd; trade name: Optool DSX) to produce the water-repellant treated layer 3 *b* having a thickness of 30 angstrom to 100 angstrom, an advantageous water repellency of the water-repellant treated layer 3 *b* can be obtained.

The frame 10 in which a carving consisting of the ink supplying inlet and the common liquid space 1 *b* is formed, is produced by a rein molding.

In the thus composed inkjet head, by applying a driving pulse shape (a pulse voltage of 10 V to 50 V) to the driven part 5 *f* according to the recording signal, the displacement of the driven part 5 *f* in the direction of the lamination is caused and the pressure of the pressed-liquid space 2 *b* is elevated by pressing the pressed-liquid space 2 *b* through the vibration plate 30, so that the ink drop is delivered through the nozzle 3 *a*.

Thereafter, with the completion of the ink drop delivery, the ink pressure in the pressed-liquid space 2 *b* is lowered and becomes negative by the inertia of the ink flow and the electric discharge of the driving pulse, so that the ink filling becomes to be performed. In this ink filling, the ink supplied from the ink tank flows into the common liquid space 1 *b* and therefrom, the ink flows through the ink inlet 6*c* and the fluid-resistance space 2 *a* into the pressed-liquid space 2 *b* in which the ink is filled.

While the fluid-resistance space 2 *a* has the effect of preventing the damping of the residual pressure vibration after the ink delivery, the fluid-resistance space 2 *a* becomes the resistance against the refilling of the ink by the surface tension of the ink. By selecting properly the fluid-resistance space 2 *a*, the balance between the damping of the residual pressure and the refilling time can be stricken, so that the time space to the next ink drop delivery (driving cycle) can be minimized.

Next, with respect to the driving pulse shape during the ink delivery to which the present invention is applied, explanations are given.

Figure 7:
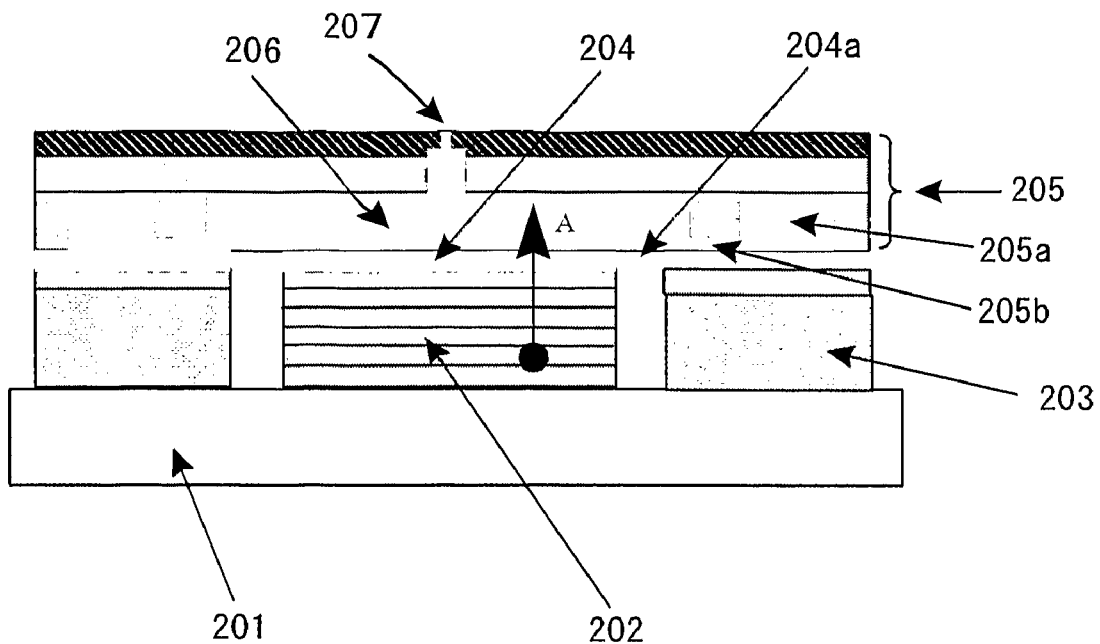
FIG. 7 is a view schematically shows an example of an inkjet head to which the driving method of the inkjet head according to the present invention is applied.
Figure 9:
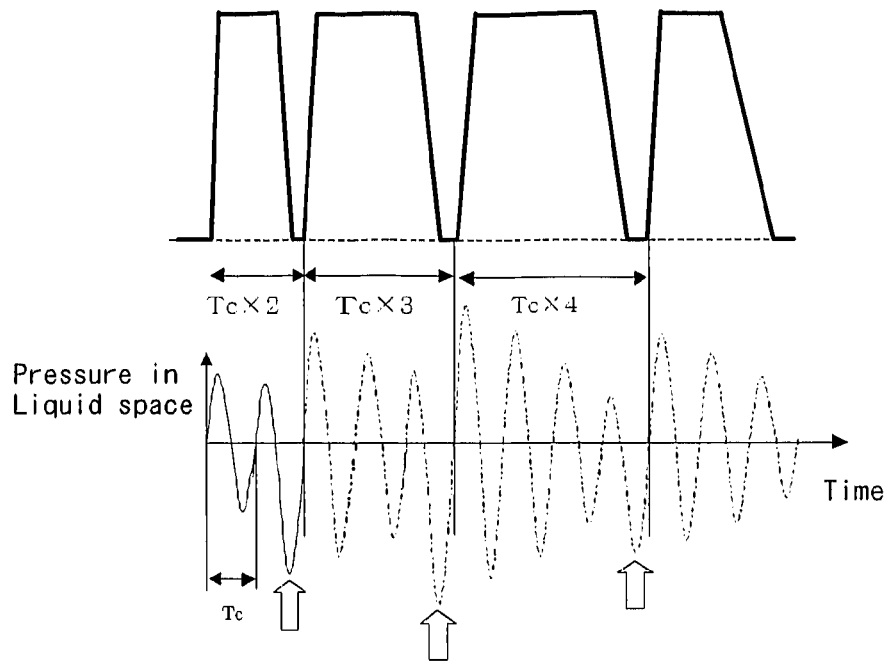
FIG. 9 is a view schematically showing an example of a driving pulse pattern explaining a method of the inkjet head for forming an ink small drop by the pull-delivery of the ink.

FIG. 7 shows an example of the inkjet head to which the inkjet head driving method according to the present invention is applied. In FIG. 7, 201 represents the substrate (here, a ceramic), 202 represents the piezo electricity vibrator as an electric energy-mechanic energy exchanging element, 203 represents the frame supporting the ink liquid space, 204 represents the vibrating plate, 205 represents the liquid space and the ink flow path, 205 *a* represents the ink common liquid space, 205 *b* represents the fluid-resistance part, 206 represents the ink pressurizing space and 207 represents the nozzle. The vibrating plate 204 has the diaphragm part 204 *a* which can be elastically deformed, at the interface between the vibrating plate 204 and the ink pressurizing space 206, by the expansion and contraction of the piezoelectricity vibrator 202 having a piezoelectricity constant of d 33, the vibrating plate 204 can retract and expand the ink pressurizing space 206. When to the piezoelectricity vibrator 202, the driving signal is applied and the piezoelectricity vibrator 202 is charged, the piezoelectricity vibrator 202 is expanded in the direction A indicated by the arrow in FIG. 7 and when the charge on the charged piezoelectricity vibrator 202 is discharged, the piezoelectricity vibrator 202 is retracted in the direction which is reverse to the above-noted direction A. Thus, the ink drop is formed using the inkjet head shown in FIG. 7 by various driving pulses shown in FIG. 9.

Figure 8:
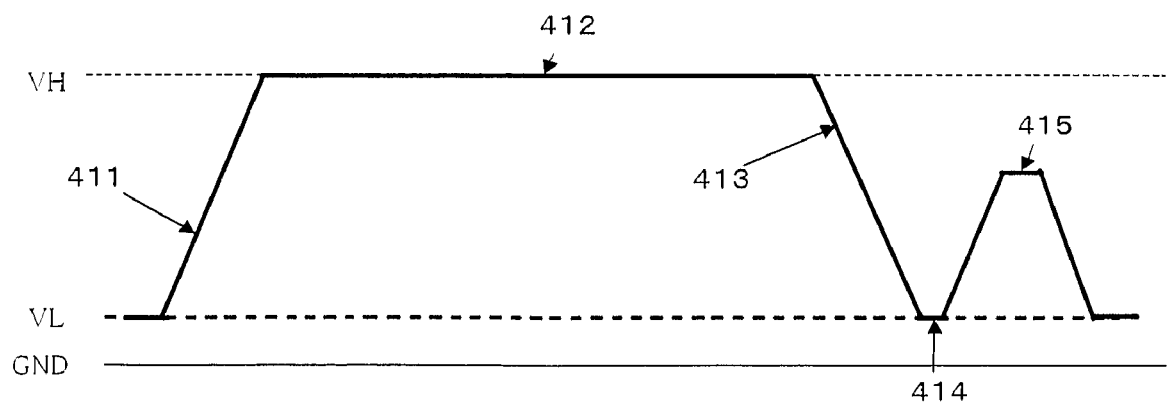
FIG. 8 is a view schematically showing an example of a driving pulse pattern of the inkjet head shown in FIG. 7.

With respect to the driving method for forming the ink droplet by the pull-delivery using an inkjet head comprising a piezoelectricity vibrator having the piezoelectricity constant of d 33, explanations are given hereinbelow. Shown in FIG. 8, the volume of the ink pressurizing space having the lowest voltage level (VL or the offset voltage level) which is lower than the GND level by several volts is decreased by the retracting signal 411. It is preset that at this time, the ink drop is not delivered. While the retracted-state holding signal 412 is applied, first, the ink meniscus moves to the outside of the nozzle, and then the ink meniscus starts to move to the inside of the ink pressurizing space. For the object of forming the ink droplet, it is so disadvantage that when while the ink meniscus moves to the out side of the nozzle first, the pull-delivery of the ink is performed, the ink drop having a desired size cannot be formed. Therefore, at the time the ink meniscus starts to move to the inside of the ink pressurizing space, the volume of the ink pressurizing space is increased by the expanding signal 413, so that the ink meniscus moves to the inside of the ink pressurizing space and after the timing for the pressure-vibration of the ink pressurizing space is controlled by the expanded-state holding signal 414, the volume of the ink pressurizing space is decreased by the retracting signal 415 and the ink droplet is delivered. Here, it is desired that to the ink pressurizing space having the offset voltage level, not an intermediate voltage level is applied, but the retracting signal 411 is applied. That is for minimizing the stress (voltage× time) applied to the piezoelectricity vibrator as small as possible.

Figure 10:
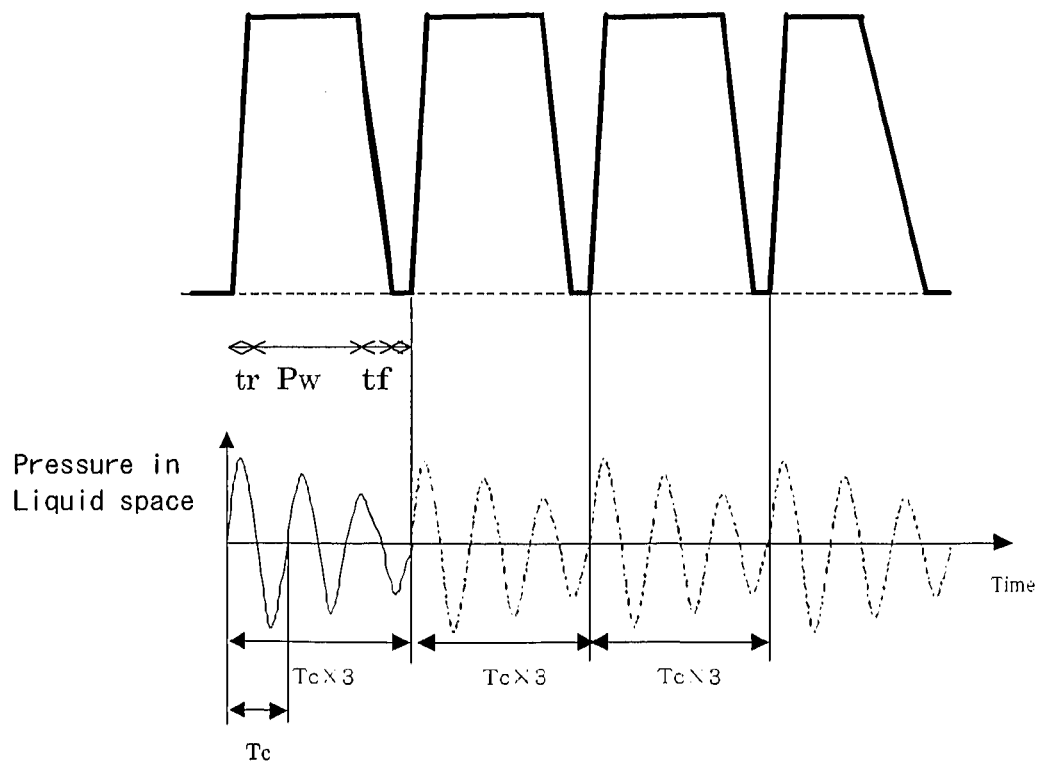
FIG. 10 is a view schematically showing an example of a driving pulse pattern explaining a method of the inkjet head by the push-delivery of the ink.
Figure 11:
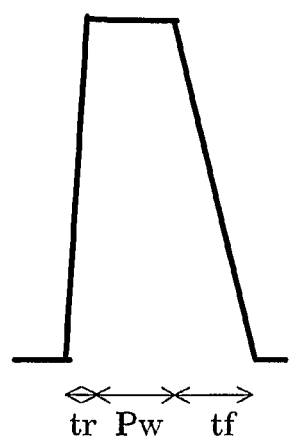
FIG. 11 is a view schematically showing an example of a driving pulse.

Next, with respect to the ink-large drop forming method by applying plural driving pulse shapes for the so-called push-delivery (i.e., delivery of the ink droplet by retracting the volume of the ink pressurizing space) continuously to the ink pressurizing space, explanations are given. As shown in FIG. 10, with respect to the constant for the rising tr, the pulse width Pw, the constant for the falling tf and the pulse distance Td, which are elements of the driving pulse shape, by presetting the value of the sum of these elements (i.e., tr+Pw+tf+Td) to an integral multiple of the value of the resonant period of the ink in the ink pressurizing space, the timing for delivering the ink droplet is during the time when the pressure in the ink pressurizing space is positive, so that the speed of the ink droplet can be accelerated. Accordingly, by the time the ink droplet reaches at the recording paper, plural ink droplets can coalesce into a large ink droplet. Actually, it is desired that the above-noted sum is preset to 2 to 3 times Tc (resonant period of the ink). When the sum is one time Tc, since the fluctuation of the pressure in the ink pressurizing space is large, at the time the volume of the ink pressurizing space is expanded by Tf after the delivery of the ink droplet, the ink in the ink pressurizing space catches a bubble and is sometimes brought into the state of none-delivery. Further, by repeating the applying of the driving pulse more times, the pressure in the ink pressurizing space is multiplied and becomes larger; however, as shown in FIG. 11, since by making the pulse width Pw of the later driving pulses longer than that of the former driving pulses, the fluctuation of the pressure in the later driving pulses can be suppressed to small, the elevation of the pressure in the ink pressurizing space is suppressed, so that the above-noted case where at the time the volume of the ink pressurizing space is expanded by tf, the ink in the ink pressurizing space catches a bubble and is brought into the state of none-delivery, can be avoided.

Figure 12:
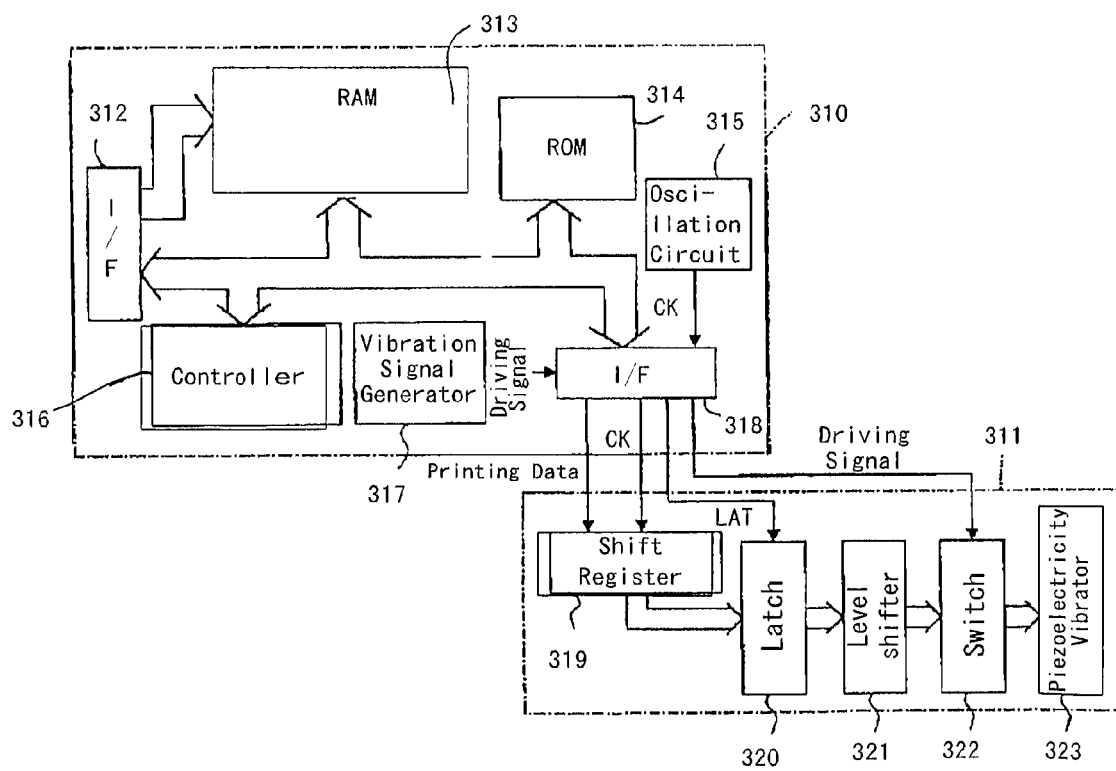
FIG. 12 is an explanatory view schematically showing an example of a printer of the inkjet system according to the present invention.

FIG. 12 is an explanatory view schematically showing an example of the composition of the inkjet printer. The inkjet printer consists of the print controller 310 and the print engine (not illustrated in FIG. 12). The print controller 310 comprises the interface 312 (hereinafter, sometimes referred to as "I/F") receiving the printing data from the host computer (not illustrated in FIG. 12), the RAM 313 performing the memorizing of various data, the ROM 314 memorizing the routine for the treatment of various data, the controlling part 316 comprising CPU, the oscillation circuit 315, the generating circuit of the driving signal 317 generating the driving signal for the below-noted printer head 311 as "a generating unit of the driving signal" and the I/F 318 transmitting the recording data and driving signal which are developed in the dot pattern data (bit map data)

RAM 313 is utilized as various buffers or work memories. ROM 314 memorizes various controlling routines, font data, graphic functions and various procedures which are performed by the controlling part 316. The controlling part 316 reads out the printing data in the receiving buffer 314 A and exchanges the printing data into the intermediate code. The data in the intermediate code are memorized in an intermediate buffer. Next, the controlling part 316 develops the data in the intermediate code read out from the RAM 313 into the dot pattern data and the dot pattern data are memorized again in another part of the RAM 313.

When the dot pattern data in an amount corresponding to that of one line of the print head 311 is obtained, the dot pattern data having an amount of the above-noted one line are serial-transmitted to the print head 311 through the I/F 318.

The print head 311 has in the sub-scanning direction, for example 64 nozzles and delivers the ink droplet at the specified timing from each nozzle. The printing data developed in the dot pattern data is serial-transmitted from the I/F 318 to the shift register 319 in synchronism with the clock signal (CK) from the oscillation circuit 315. The serial-transmitted printing data are temporally latched by the latch circuit 320. The voltage of the latched printing data is elevated by the level shifter 321 which is a voltage amplifier to a voltage which can control the switch circuit 322, for example to a specified voltage, such as some tens of volts. The printing data having a voltage which is elevated to a specified voltage are given to the switch circuit 322 as "a switching unit". In the input side of the switch circuit 322, the driving signal from the driving signal generating circuit 317 is applied and with the output side of the switch circuit 322, the piezoelectricity vibrator 323 as "a pressure generating element" is connected. The printing data control the operation of the switch circuit 322. For example, during the time the printing data applied to the switch circuit 322 are "1", the driving signal is applied to the piezoelectricity vibrator 323 and according to the driving signal, the piezoelectricity vibrator 323 is expanded and retracted. On the other hand, during the time the printing data applied to the switch circuit 322 are "0", the supply of the driving signal to the piezoelectricity vibrator 323 is interrupted.

Figure 13:
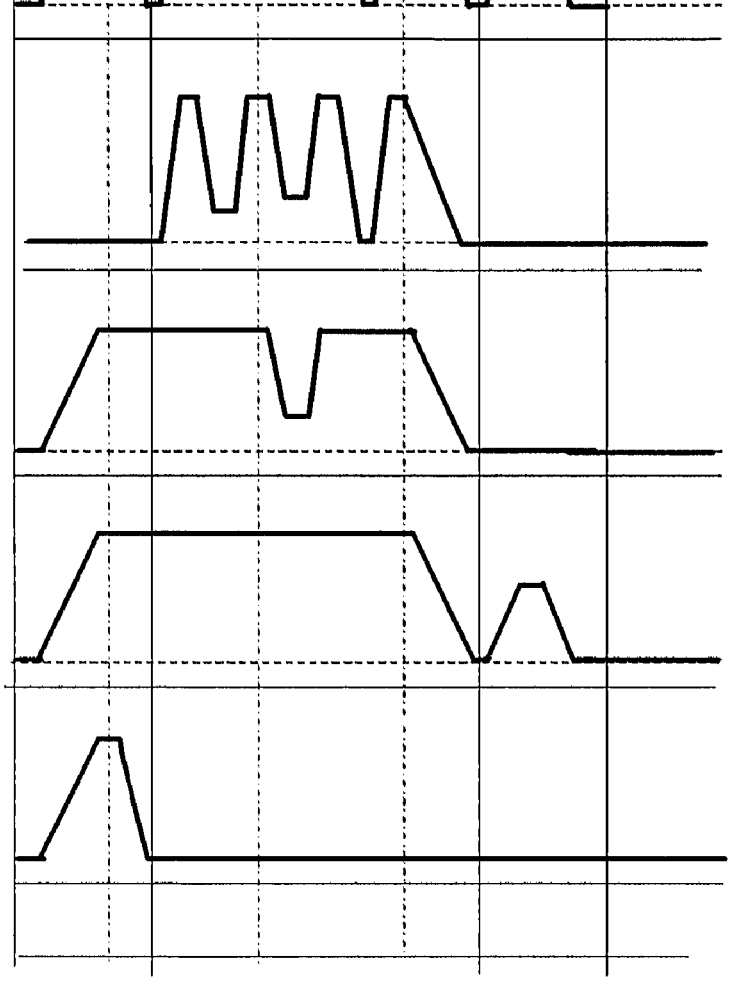
FIG. 13 A to FIG. 13 E are explanatory views schematically showing an example of a pulse pattern comprising six pulses.

Next, with respect to the driving pulse and the amount of the ink droplet Mj, referring to FIGS. 13 A to 18, explanations are given.

As shown in FIG. 13 A, by these selected driving pulses or driving pulses formed comprising a part of a pulse shape element of the driving pulse, a maximum ink droplet, a middle ink droplet or a small ink droplet can be formed. Explanations more in detail are given as follows. The first pulse comprises retracting the ink pressurizing space and is preset to have an inclination for preventing the delivery of the ink droplet. As shown in FIG. 13E, by selecting this driving pulse and by vibrating the ink pressurizing space several times at the timing of, for example reversing the main scanning direction of the ink jet head during the none-printing rendering the ink around the nozzle having a high viscosity can be prevented and the printing quality can be improved.

Here, by rendering the printing data applied to the switch circuit 322 "1" until the time S1 and by rendering the printing data "0" from the time S2 to the time S5, the supply of the driving signal to the piezoelectricity vibrator 323 is interrupted and the applied charge by the first pulse is maintained in the piezoelectricity vibrator 323. By starting the supply of the driving signal to the piezoelectricity vibrator 323 through rendering again the printing data applied to the switch circuit 322 "1" at the time S6 and the time S7, the driving pulse shown in FIG. 13D can be obtained. As noted above, at this time, the small ink droplet can be formed.

Further, by rendering the printing data applied to the switch circuit 322 "0" from the time S1 to S5, by rendering the printing data "1" from the time S3 to S6 and by rendering the printing data "0" again at the time S7, the driving pulse shown in FIG. 13B can be obtained. At this time, the maximum ink droplet can be formed.

In this case, for performing the push-delivery, it is preset that the ink droplet is delivered at the time the second pulse starts to rise. From this requirement, for obtaining the ink small droplet and the ink maximum droplet respectively by pull-delivery and push delivery (i.e., plural pulses), as noted above, the first pulse reaching at a desired voltage without the delivery is required.

As shown in FIG. 13C, by butting the pulse shape elements of the second pulse to the fifth pulse together, the ink middle droplet can be formed. In this case, it is important that the pulse shape element of the fifth pulse (the latest pulse) is not used. In other words, even if it is preset that for forming the middle ink droplet, the driving condition contains the fifth pulse, when it is intended that the large ink droplet is delivered using driving pulses of the second pulse to the fifth pulse, the speed of the ink droplet delivered at last becomes small and the last-delivered droplet cannot join the coalescing of the droplets sometimes. Accordingly, when the driving condition is so preset that the middle ink droplet is formed using pulse shape elements of the second pulse, the third pulse and the fourth pulse (without the fifth pulse), it is advantageous that the condition of the pulse shape element of the fifth pulse can be preset irrespective of the driving condition for forming the middle ink droplet. The driving pulse selecting of each driving condition is summarized in FIG. 14. In FIG. 14, Mj 1 represents the maximum droplet, Mj 2 represents the middle droplet and Mj 3 represents the small droplet.

As shown in FIG. 13A, by rendering the voltage heights of the first pulse to the fifth pulse the same, the pulse shape elements can be smoothly butted together, so that the stress to the driving IC, such as the in rush current can be avoided.

Figure 15:
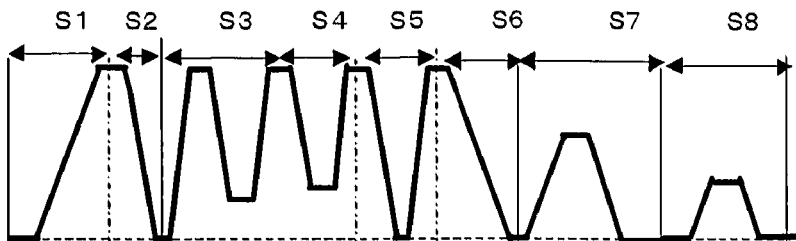
FIG. 15 A to FIG. 15 E are explanatory views schematically showing an example of a pulse pattern comprising seven pulses.
Figure 15:
Figure 15:
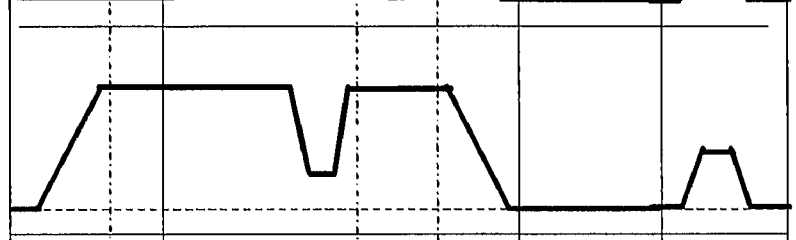
Figure 15:
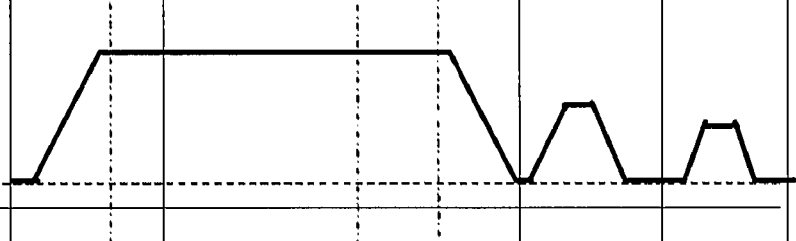
Figure 15:
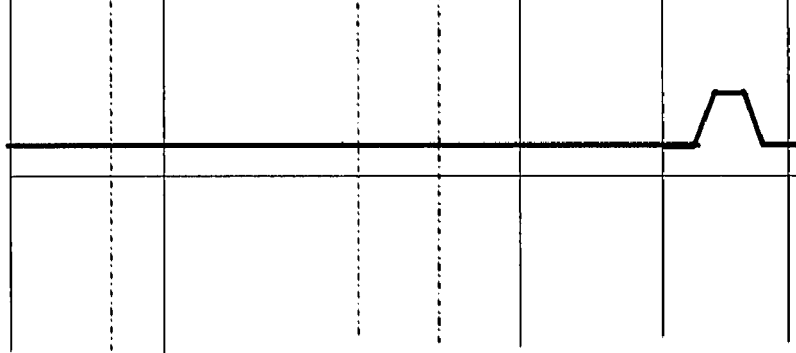

Next, as shown in FIGS. 15 A to 15 E, the driving pulse group consists of seven driving pulses. The voltage height of the seventh (last) driving pulse is less than those of the other driving pulses so that the seventh driving pulse is so preset to deliver no droplet. The object of the seventh driving pulse is that by vibrating the ink pressurizing space several times, the enhancement of the viscosity of the ink around the nozzle can be prevented and the printing quality is improved; however, when the above-noted first driving pulse is finely vibrated, the voltage height of the driving pulse should be enhanced and accordingly the volume of the ink pressurizing space should be largely retracted, so that a disadvantage is caused wherein the printing quality is lowered, for example the ink droplet is leaked by an outer disturbance. Therefore, when a driving pulse for retracting small the volume for the ink pressurizing space is used, the above-noted disadvantage is not caused. Further, by applying this driving pulse during each printing, the effect for preventing the enhancement of the viscosity of the ink around the nozzle is furthermore improved. The driving pulse selecting of each driving condition in this case is summarized in FIG. 16.

Figure 17:
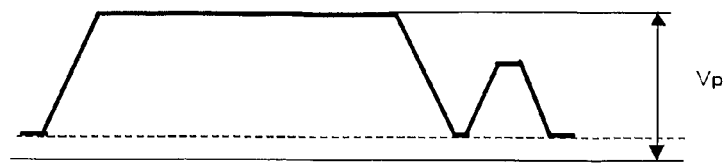
FIG. 17 A to FIG. 17 C are explanatory views schematically showing a relationship between the driving pulse and the voltage.
Figure 17:
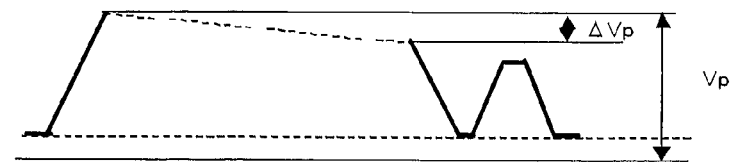
Figure 17:
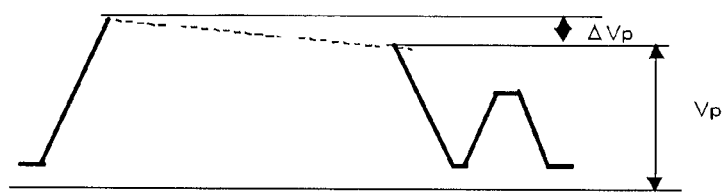

Next, as shown in FIG. 14, even if it is intended that the driving pulse is applied as shown in FIG. 17A, since as shown in FIG. 17B, the voltage applied to the piezoelectricity vibrator 323 is generated by the maintained charge, actually, the charge is discharged little by little, so that a slight voltage fall $\Delta Vp$ is caused. The amount of the voltage fall contributes to expanding the volume of the piezoelectricity vibrator 323. Thus a disadvantage is caused wherein the size of the delivered ink droplet is changed. Therefore, as shown in FIG. 17C, by applying the initially-applied voltage which is higher than the specified initially-applied voltage by the above-noted amount of the voltage fall $\Delta Vp$ for applying the specified voltage at the timing where the ink droplet is delivered, a desired ink droplet can be obtained.

Figure 18:
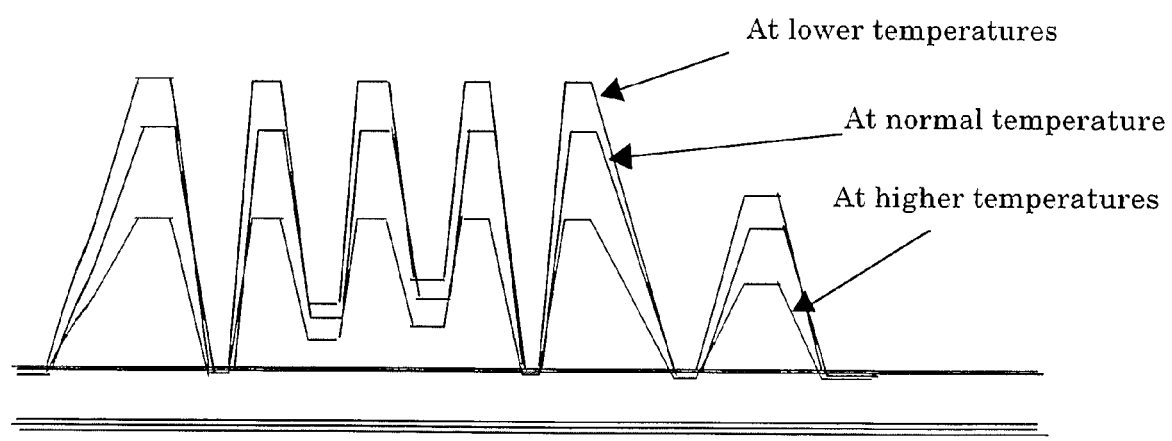
FIG. 18 is an explanatory view schematically showing a relationship between the change of the driving pulse by the environmental temperature.

Further, the change of the ink properties due to the change of the environmental temperature can be compensated by the voltage is height Vp of the driving pulse (see FIG. 18).

In other words, by enlarging Vp when the environmental temperature is low and by minimizing Vp when the environmental temperature is high, the constant speed and size of the ink droplet can be obtained always irrespective of the environmetal temperature. Explanations are given above with respect to a piezoelectricity vibrator 323 comprising a piezoelectricity layer of PZT which is displaced in the direction of d33; however, the piezoelectricity vibrator 323 may be a piezoelectricity vibrator 323 comprising PZT of a vibration-by deflection type. However, by using PZT which is displaced in the direction of d33, the reliability of the piezoelectricity element is higher and the failure rate of the apparatus comprising the element can be suppressed lower, than by using PZT of a vibration-by deflection type.

Next hereinbelow, with respect to the maintaining unit 71 in the inkjet recording apparatus according to the present invention, explanations are given.

Figure 19:
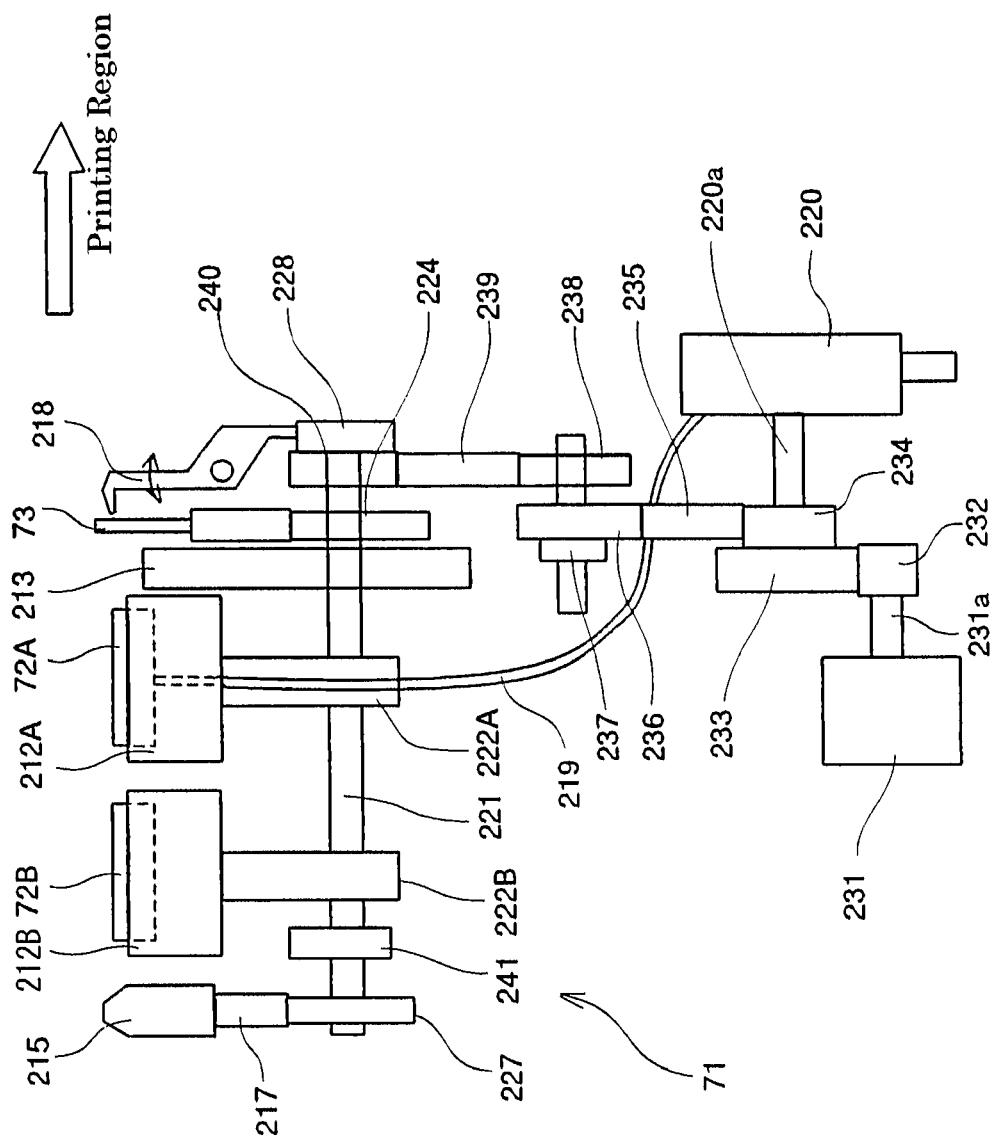
FIG. 19 is a view schematically showing an example of a maintaining unit for the inkjet recording apparatus according to the present invention.

As shown in FIG. 19, first, when the motor 231 is rotated normally, the motor gear 232, the pump gear 234, the intermediate gears 236 and 237 are rotated and the tube pump 220 is operated, so that the inside of the most right (in the side of the recording region) cap which is connected with the pump through the tube 219 is absorbed. Other gears are not operated, since the one way crutch is not connected.

When the motor 231 is rotated reversely, the one way crutch 237 is connected and from the motor 231 to the cam axis are rotated. The tube pump 220 is rotated reversely, however is not operated as the pump.

To the cam axis 221, the carriage lock cam 227, the cap cams 222 A and 222 B, the wiper cam 224, the wiper cleaner cam 228 and the cam for the home position sensor 241 are attached so that they are rotated as integrated parts.

The carriage lock 215 is biased upwards (in the direction of "locking") by a compression spring (not illustrated in FIG. 19). The carriage lock 215 moves upwards and downwards by the carriage lock arm 217 contacted with the cam surface of the carriage lock cam 227.

The caps 72 A and 72 B and the cap holder 212 A move upwards and downwards by the cap cams 222 A and 222 B.

The wiper 73 moves upwards and downwards by the wiper cam 228.

The wiper cleaner 218 is biased by a spring in the direction of departing from the wiper 73 and is operated toward the wiper by the wiper cleaner cam 218. While the wiper 73 falls between the wiper cleaner 218 and the receiver of the blanc-delivery, the ink attached to the wiper 73 is scrubbed into the receiver of the blanc-delivery.

To the maintaining unit main body, a sensor (a photo interrupter/not illustrated in FIG. 19) is fixed and the composition is so preset that when the cap is moved by the home position cam to the lowest position, the HP lever (not illustrated in FIG. 19) is operated and the sensor is opened, so that the sensor detects the home positions of the motors (except the pump) (in other cases, the HP lever is not operated and the sensor is always closed.).

At the time the power source is applied, the cap is moved upwards and downwards irrespective of the positions of the caps 72 A and 72 B and the cap holders 212 A and 212 B (until the start of the moving, the detection of the position is not performed). After the cap has detected the home position of the cap (during the rising), the cap is moved in a specified amount and to the lowest position. Thereafter, the carriage is moved right and left and after the carriage detects the position, the carriage returns to the position of capping, so that the carriage is capped.

When the motor is rotated reversely, as the order of the operation, the series of the operation comprising the rising of the cap (the carriage lock is almost simultaneously performed), the falling of the cap (the carriage lock is almost simultaneously performed), the opening of the home position sensor, the rising of the wiper, the start of the operation of the wiper cleaner (the wiper is pressed to the receiver of the blanc-delivery), the falling of the wiper (the wiper is scrubbed by the wiper cleaner) and the returning of the wiper cleaner to the home position thereof, are repeated.

The inkjet recording apparatus and inkjet recording process according to the present invention can be applied to various recording according to the inkjet recording system, for example particularly preferably to the inkjet recording printer, the facsimile apparatus, the copy apparatus and a printer/facsimile/copier composite apparatus.

(Ink Record)

The record recorded by the inkjet recording apparatus and inkjet recording process according to the present invention is the ink record according to the present invention. The ink record according to the present invention comprises an image formed on a recording medium using the recording ink according to the present invention.

The recording medium is not restricted and may be properly selected depending on the application. Examples of the recording medium include the normal paper, the glossy paper, the specified paper, the cloth, the film and the OHP sheet. These recording media may be used individually or in combination.

The record has a high image quality and no spread of the ink, is excellent in the aging stability and can be preferably used in various applications, such as various materials in which letters are printed or images are recorded.

Hereinbelow, explanations are given with respect to Examples according to the present invention, which should not be construed as limiting the scope of the present invention.

PREPARATION EXAMPLE 1

Preparing of Polymer Fine Particles Dispersion Comprising Copper-Phthalocyanine Pigment The 1 L flask equipped with a mechanical stirrer, a thermometer, a refluxing tube and a dropping funnel was fully purged with nitrogen gas and into the flask, 11.2 g of styrene, 2.8 g of acrylic acid, 12.0 g of lauryl methacrylate, 4.0 g of polyethyleneglycol methacrylate, 4.0 g of styrene macromer (manufactured and sold by Toa Gosei Co., Ltd.; trade name: AS-6) and 0.4 g of mercapto ethanol were fed, followed by heating the flask at the temperature of 65° C. Next, the first mixture solution of 100.8 g of styrene, 25.2 g of acrylic acid, 108.0 g of lauryl methacrylate, 36.0 g of polyethyleneglycol methacrylate, 60.0 g of hydroxyethyl methacrylate, 36.0 g of styrene macromer (manufactured and sold by Toa Gosei Co., Ltd.; trade name: AS-6), 3.6 g of mercapto ethanol 2.4 g of azobisdimethylvalelonitrile and 18 g of methyl ethyl ketone was dropped into the flask for 25 hours.

After the dropping of the first mixture solution, the second mixture solution of 0.8 g of azobisdimethylvalelonitrile and 18 g of mercapto ethanol was dropped into the flask for 0.5 hour. The flask was left at 65° C. for one hour for aging the content of the flask and into the flask, 0.8 g of azobisdimethylvalelonitrile was fed, followed by aging the content of the flask for one hour. After the completion of the reaction, into the flask, 364 g of methyl ethyl ketone was fed, thereby obtaining 800 g of a polymer solution having the concentration of 50% by mass. Next, a part of the obtained polymer solution was dried and subjected to the measurement of the gel permeation chromatography (standard substance: polystyrene, solvent: tetrahydrofuran), thereby finding the weight average molecular weight of the obtained polymer to be 15,000 as the result of the measurement.

Next, 28 g of the above-obtained polymer solution, 26 g of a copper phthalocyanine pigment, 13.6 g of a 1 mol/L aqueous solution of potassium hydroxide, 20 g of methyl ethyl ketone and 30 g of an ion-exchanged water were thoroughly mixed. Thereafter, the thus obtained mixture was kneaded twenty times using a triple roll mill (manufactured and sold by Noritake Co., Ltd.; trade name: NR-84A). The obtained paste was introduced into 200 g of an ion-exchanged water, followed by stirring the resultant mixture thoroughly and using an evaporator, methyl ethyl ketone and water were distilled off from the mixture, thereby obtaining 160 g of a blue polymer fine particles dispersion having the solid concentration of 20% by mass.

The obtained polymer fine particles were subjected to the measurement of the average particle diameter using a particle size distribution measuring apparatus (manufactured and sold by Nikkiso Co., Ltd.; trade name: Microtrack UPA) and the average particle diameter (D 50%) was found to be 93 nm.

PREPARATION EXAMPLE 2

Preparing of Polymer Fine Particles Dispersion Comprising Dimethylquinacridone Pigment A red-violet polymer fine particles dispersion was prepared in substantially the same manner as in Production Example 1, except that the copper phthalocyanine pigment was changed to a pigment "pigment red 122".

The obtained polymer fine particles were subjected to the measurement of the average particle diameter using a particle size distribution measuring apparatus (manufactured and sold by Nikkiso Co., Ltd. trade name: Microtrack UPA) and the average particle diameter (D 50%) was found to be 127 nm.

PREPARATION EXAMPLE 3

Preparing of Polymer Fine Particles Dispersion Comprising Monoazo Yellow Pigment A yellow polymer fine particles dispersion was prepared in substantially the same manner as in Production Example 1, except that the copper phthalocyanine pigment was changed to a pigment "pigment yellow 74".

The obtained polymer fine particles were subjected to the measurement of the average particle diameter using a particle size distribution measuring apparatus (manufactured and sold by Nikkiso Co., Ltd.; trade name: Microtrack UPA) and the average particle diameter (D50%) was found to be 76 nm.

PREPARATION EXAMPLE 4

Preparing of Carbon Black Dispersion 300 g of a commercially available carbon black having pH of 2.5 (manufactured and sold by Cabot Corporation; trade name Monarch 1300) and 1,000 mL of water were thoroughly mixed. To the resultant mixture, 450 g of sodium hypochlorite (having an available chlorine of 12%) were dropped, followed by stirring the mixture at 100° C. to 105° C. for eight hours. To the mixture, further 100 g of sodium hypochlorite (having an available chlorine of 12%) was added and the mixture was dispersed using a horizontal dispersing apparatus for three hours, thereby obtaining a slurry. The obtained slurry was diluted ten times with water and the pH of the slurry was adjusted with lithium hydroxide. The slurry was desalted and condensed using an ultrafiltration membrane until the slurry has a conductivity of 0.2 mS/cm and a carbon black dispersion having a pigment concentration of 15% was obtained. The obtained carbon black dispersion was subjected to a centrifuging for removing coarse particles and further to a filtration using a nylon filter having a pore size of 1 μm, thereby obtaining a carbon black dispersion.

The obtained polymer fine particles were subjected to the measurement of the average particle diameter using a particle size distribution measuring apparatus (manufactured and sold by Nikkiso Co., Ltd.; trade name: Microtrack UPA) and the average particle diameter (D50%) was found to be 95 nm.

PREPARATION EXAMPLE 5

Preparing of Polymer Fine Particles Dispersion Comprising Carbon Black

A black polymer fine particles dispersion was prepared in substantially the same manner as in Production Example 1, except that the copper phthalocyanine pigment was changed to a carbon black (manufactured and sold by Degussa GmbH.; trade name: FW 100).

The obtained polymer fine particles were subjected to the measurement of the average particle diameter using a particle size distribution measuring apparatus (manufactured and sold by Nikkiso Co., Ltd.; trade name: Microtrack UPA) and the average particle diameter (D50%) was found to be 104 nm.

PREPARATION EXAMPLE 6

Preparing of Dispersion of Carbon Black Treated with Diazo Compound 100 g of a carbon black having a surface area of 230 m²/g and a DBP oil absorption of 70 ml/100 g and 34 g of p-amino-N-benzoic acid were mixed and dispersed into 750 g of water and to the resultant dispersion, 16 g of nitric acid was dropped, followed by stirring the dispersion at 70° C. After 5 minutes, to the dispersion, a solution in which 11 g of sodium nitrite was dissolved in 50 g of water was added, followed by stirring the dispersion further one hour. The obtained slurry was diluted ten times and subjected to a centrifuging for removing coarse particles. Thereafter, the pH of the slurry was adjusted with diethanol amine to 8 to 9, and the slurry was desalted and condensed by subjecting the slurry to a filtration using an ultrafiltration filter, thereby obtaining a carbon black dispersion having a pigment concentration of 15% by mass. The obtained carbon black dispersion was further subjected to a filtration using a polypropylene filter having a pore size of 0.5 μm, thereby obtaining the carbon black dispersion of Production Example 6.

The obtained polymer fine particles were subjected to the measurement of the average particle diameter using a particle size distribution measuring apparatus (manufactured and sold by Nikkiso Co., Ltd.; trade name: Microtrack UPA) and the average particle diameter (D50%) was found to be 99 nm.

PREPARATION EXAMPLE 7

Preparing of Dispersion of Carbon Black Treated with Sulfonating Agent 150 g of a commercially available carbon black pigment (manufactured and sold by Degussa GmbH.; trade name: Printex #85) was mixed thoroughly into 400 ml of sulforan, followed by dispersing the resultant dispersion slightly using a beads mill and to the dispersion, 15 g of amidosulfuric acid was added, followed by stirring the dispersion at 140° C. to 150° C. for ten hours, thereby obtaining a slurry. The obtained slurry was introduced into 1,000 mL of an ion-exchanged water and the resultant mixture was subjected to a surface treatment using a centrifugal separator under 12,000 rpm, thereby obtaining a carbon black wet cake. The obtained carbon black wet cake was dispersed again in 2,000 mL of an ion-exchanged water and the pH of the resultant dispersion was adjusted using lithium hydroxide, followed by subjecting the dispersion to a desalting and a condensation using an ultrafiltration filter, thereby obtaining a carbon black dispersion having a pigment concentration of 10% by mass. The obtained carbon black dispersion was subjected to a filtration using a nylon filter having a pore size of 1 μm, thereby obtaining a carbon black. The average particle diameter of the obtained carbon black was measured to be 80 nm.

Next, using a polymer fine particles dispersion and a carbon black dispersion obtained in the above-noted Production Examples 1 to 7, an ink composition was produced. The viscosity and the amount of a wetting agent of ink compositions obtained in the below-noted Examples and Comparative Examples are shown in Table 1.

The measurement of the above-noted viscosity was performed using a viscosity measuring apparatus (manufactured and sold by Toki Sangyo Co., Ltd.; trade name: R 500 rotating viscometer) at 25° C.

Example 1

Production of Ink Composition 20.00% by mass of a polymer fine particles dispersion comprising a copper phthalocyanine pigment which was prepared in the above-noted Preparation Example 1, 23.0% by mass of 3-methyl-1,3-butandiol, 8.0% by mass of glycerin, 2.0% by mass of 2-ethyl-1,3-hexanediol, 2.5% by mass of FS-300 (manufactured and sold by Du Pont Corporation), 0.2% by mass of Proxel LV (manufactured and sold by Avecia Limited), 0.5% by mass of 2-amino-2-ethyl-1,3-propanediol and a proper amount of an ion-exchanged water, thereby preparing 100% by mass of an ink composition and the prepared ink composition was filtered using a membrane filter having an average pore diameter of 0.8 μm, thereby producing the ink composition of Example 1.

Example 2

Production of Ink Composition 20.0% by mass of a polymer fine particles dispersion comprising a dimethylquinacridone pigment which was prepared in the above-noted Preparation Example 2, 22.5% by mass of 3-methyl-1,3-butandiol, 9.0% by mass of glycerin, 2.0% by mass of 2-ethyl-1,3-hexanediol, 2.5% by mass of FS-300 (manufactured and sold by Du Pont Corporation), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 2.

Example 3

Production of Ink Composition 20.0% by mass of a polymer fine particles dispersion comprising a monoazo yellow pigment which was prepared in the above-noted Preparation Example 3, 24.5% by mass of 3-methyl-1,3-butandiol, 8.0% by mass of glycerin, 2.0% by mass of 2-ethyl-1,3-hexanediol, 2.5% by mass of FS-300 (manufactured and sold by Du Pont Corporation), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 3.

Example 4

Production of Black Pigment Ink Composition 20.0% by mass of a carbon black dispersion which was prepared in the above-noted Preparation Example 7, 22.5% by mass of 3-methyl-1,3-butandiol, 7.5% by mass of glycerin, 2.0% by mass of 2-pyrrolidone, 2.0% by mass of 2-ethyl-1,3-hexanediol, 2.0% by mass of R—$(OCH_2CH_2)_n$ OH (, wherein R represents $C_{12}$ alkyl group and n is 9), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 4.

Example 5

Production of Ink Composition 20.0% by mass of a polymer fine particles dispersion comprising a copper phthalocyanine pigment which was prepared in the above-noted Preparation Example 1, 7.0% by mass of 3-methyl-1,3-butandiol, 5.5% by mass of 1,3-butanediol, 8.0% by mass of glycerin, 2.0% by mass of 2-ethyl-1,3-hexanediol, 1.5% by mass of FS-300 (manufactured and sold by Du Pont Corporation), 0.2% by mass of Proxel (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 5.

Example 6

Production of Ink Composition 20.0% by mass of a polymer fine particles dispersion comprising a dimethylquinacridone pigment which was prepared in the above-noted Preparation Example 2, 11.5% by mass of 3-methyl-1,3-butandiol, 7.5% by mass of glycerin, 2.0% by mass of 2-ethyl-1,3-hexanediol, 1.5%, by mass of FS-300 (manufactured and sold by Du Pont Corporation), 0.2% by mass of Proxel (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 6.

Example 7

Production of Ink Composition 20.0% by mass of a polymer fine particles dispersion comprising a monoazo yellow pigment which was prepared in the above-noted Preparation Example 3, 6.0% by mass of 3-methyl-1,3-butandiol, 8.5% by mass of 1,3-hexanediol, 8.0% by mass of glycerin, 2.0% by mass of 2-ethyl-1,3-hexanediol, 1.5% by mass of FS-300 (manufactured and sold by Du Pont Corporation), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 7.

Example 8

Production of Ink Composition 5.0% by mass of a polymer fine particles dispersion comprising a carbon black which was prepared in the above-noted Preparation Example 5, 11.5% by mass of 2-methyl-2,4-pentanediol, 13.0% by mass of 3-methyl-1,3-butandiol, 7.5% by mass of glycerin, 2.0% by mass of 2-pyrrolidone, 2.0% by mass of an amphoteric surfactant (manufactured and sold by NOF Corporation; trade name: Unisafe A-LY), 2.0% by mass of 2,2,4-trimethyl-1,3-pentanediol, 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 μm, thereby producing the ink composition of Example 8.

Example 9

Production of Ink Composition 20.0% by mass of a polymer fine particles dispersion comprising a copper phthalocyanine pigment which was prepared in the above-noted Preparation Example 1, 10.5% by mass of 3-methyl-1,5-pentandiol, 13.0% by mass of 3-methyl-1,3-butandiol, 8.0% by mass of glycerin, 2.0% by mass of 2,2,4-trimethyl-1,3-pentanediol, 1.5% by mass of FS-300 (manufactured and sold by Du Pont Corporation), 0.2% by mass of Proxel LV (manufactured and sold by Avecia Limited), 0.5% by mass of 2-amino-2-ethyl-1,3-propanediol and a proper amount of an ion-exchanged water, thereby preparing 100% by mass of an ink composition and the prepared ink composition was filtered using a membrane filter having an average pore diameter of 0.8 μm, thereby producing the ink composition of Example 9.

Example 10

Production of Ink Composition 20.0% by mass of a polymer fine particles dispersion comprising a dimethylquinacridone pigment which was prepared in the above-noted Preparation Example 2, 5.0% by mass of 3-methyl-1,5-pentandiol, 5.0% by mass of 3-methyl-1,3-butandiol, 7.5% by mass of glycerin, 2.0% by mass of 2-ethyl-1,3-hexanediol, 2.0% by mass of 2,2,4-trimethyl-1,3-pentanediol, 1.0% by mass of F-470 (manufactured and sold by Dainippon Ink & Chemicals Inc.), 0.2% by mass of Proxel (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 µm, thereby producing the ink composition of Example 10.

Example 11

Production of Ink Composition 20.0% by mass of a polymer fine particles dispersion comprising a monoazo yellow pigment which was prepared in the above-noted Preparation Example 3, 12.5% by mass of 3-methyl-1,5-pentandiol, 15.0% by mass of 3-methyl-1,3-butandiol, 7.0% by mass of glycerin, 2.0% by mass of 2,2,4-trimethyl-1,3-pentanediol, 1.5% by mass of FS-300 (manufactured and sold by Du Pont Corporation; having 40% by mass of an active ingredient), 1.5% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 µm, thereby producing the ink composition of Example 11.

Example 12

Production of Black Pigment Ink Composition 20.0% by mass of a carbon black dispersion which was prepared in the above-noted Preparation Example 6, 12.5% by mass of 3-methyl-1,3-butandiol, 7.5% by mass of glycerin, 2.0% by mass of 2-pyrrolidone, 2.0% by mass of 2-ethyl-1,3-hexanediol, 2.0% by mass of R—(OCH$_2$CH$_2$)$_n$OH (, wherein R represents C$_{12}$ alkyl group and n is 9), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 µm, thereby producing the ink composition of Example 12.

Example 13

Production of Black Pigment Ink Composition 20.0% by mass of a carbon black dispersion which was prepared in the above-noted Preparation Example 5, 22.5% by mass of 3-methyl-1,3-butandiol, 7.5% by mass of glycerin, 2.0% by mass of 2-pyrrolidone, 2.0% by mass of 2-ethyl-1,3-hexanediol, 2.0% by mass of R—(OCH$_2$CH$_2$)$_n$OH (, wherein R represents C$_{12}$ alkyl group and n is 9), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 µm, thereby producing the ink composition of Example 13.

Example 14

Production of Black Pigment Ink Composition 20.0% by mass of a carbon black dispersion which was prepared in the above-noted Preparation Example 4, 17.5% by mass of 3-methyl-1,3-butandiol, 5.5% by mass of glycerin, 2.0% by mass of 2-pyrrolidone, 2.0% by mass of 2-ethyl-1,3-hexanediol, 1.5% by mass of FS-300 (manufactured and sold by Du Pont Corporation; having 40% by mass of an active ingredient), 0.2% by mass of Proxel LV (manufactured and sold by Avecia Limited), 0.5% by mass of 2-amino-2-ethyl-1,3-propanediol and a proper amount of an ion-exchanged water were mixed, thereby preparing 100% by mass of an ink composition and the prepared ink composition was filtered using a membrane filter having an average pore diameter of 0.8 µm, thereby producing the ink composition of Example 14.

Example 15

Production of Ink Composition

The ink composition of Example 15 was produced in substantially the same manner as in Example 1, except that the amount of 3-methyl-1,3-butanediol was changed to 30% by mass and the amount of glycerin was changed to 12% by mass.

Example 16

Production of Ink Composition

The ink composition of Example 16 was produced in substantially the same manner as in Example 2, except that 2.5% by mass of FS-300 (manufactured and sold by Du Pont Corporation; having 40% by mass of an active ingredient) was changed to 0.5% by mass of EP-905 (manufactured and sold by Nippon Shokubai Co., Ltd.).

Example 17

Production of Ink Composition

The ink composition of Example 17 was produced in substantially the same manner as in Example 3, except that 2.5% by mass of FS-300 (manufactured and sold by Du Pont Corporation; having 40% by mass of an active ingredient) was changed to 0.5% by mass of BL-SF (manufactured and sold by NOF Corporation).

Example 18

Production of Ink Composition

The ink composition of Example 18 was produced in substantially the same manner as in Example 4, except that 2.0% by mass of R—(OCH$_2$CH$_2$)$_n$OH (, wherein R represents C$_{12}$ alkyl group and n is 9) was changed to 1.0% by mass of Surfynol (manufactured and sold by Air Products and Chemicals, Inc., U.S.A.).

COMPARATIVE EXAMPLE 1

Production of Ink Composition

The ink composition of Comparative Example 1 was produced in substantially the same manner as in Example 1, except that instead of 3-methyl-1,3-butanediol, 1,3-butanediol was used.

COMPARATIVE EXAMPLE 2

Production of Ink Composition

The ink composition of Comparative Example 2 was produced in substantially the same manner as in Example 2, except that instead of 3-methyl-1,3-butanediol, 1,5-pentanediol was used and instead of 2.5% by mass of FS-300 (manufactured and sold by Du Pont Corporation; having 40% by mass of an active ingredient), 0.5% by mass of FT-110 (manufactured and sold by Neos Co., Ltd.) was used.

COMPARATIVE EXAMPLE 3

Production of Ink Composition

The ink composition of Comparative Example 3 was produced in substantially the same manner as in Example 3, except that instead of 3-methyl-1,3-butanediol, 1,3-butanediol was used.

COMPARATIVE EXAMPLE 4

Production of Ink Composition

The ink composition of Comparative Example 1 was produced in substantially the same manner as in Example 4, except that instead of 3-methyl-1,3-butanediol, 1,5-pentanediol was used.

COMPARATIVE EXAMPLE 5

Production of Ink Composition

The ink composition of Comparative Example 5 was produced in substantially the same manner as in Example 5, except that instead of 3-methyl-1,3-butanediol, 1,5-pentanediol was used.

COMPARATIVE EXAMPLE 6

Production of Ink Composition

The ink composition of Comparative Example 6 was produced in substantially the same manner as in Example 6, except that instead of 3-methyl-1,3-butanediol, 1,5-pentanediol was used.

COMPARATIVE EXAMPLE 7

Production of Ink Composition

The ink composition of Comparative Example 7 was produced in substantially the same manner as in Comparative Example 3, except that the amount of 3-methyl-1,3-butanediol was changed to 10% by mass and the amount of glycerin was changed to 5% by mass.

COMPARATIVE EXAMPLE 8

Production of Ink Composition

The ink composition of Comparative Example 8 was produced in substantially the same manner as in Comparative Example 4, except that the amount of 1,5-pentanediol was changed to 10% by mass and the amount of glycerin was changed to 8% by mass.

COMPARATIVE EXAMPLE 9

Production of Ink Composition

The ink composition of Comparative Example 9 was produced in substantially the same manner as in Comparative Example 5, except that the amount of 1,5-pentanediol was changed to 31% by mass and the amount of glycerin was changed to 22% by mass.

TABLE 1

|  | Viscosity (mPa · s) | Amount of Wetting Agent (% by mass) |
|---|---|---|
| Example 1 | 8.05 | 31.0 |
| Example 2 | 8.09 | 31.5 |
| Example 3 | 8.11 | 32.5 |
| Example 4 | 8.24 | 30.0 |
| Example 5 | 5.98 | 20.5 |
| Example 6 | 7.99 | 31.0 |
| Example 7 | 6.04 | 22.0 |
| Example 8 | 7.97 | 32.0 |
| Example 9 | 8.06 | 31.5 |
| Example 10 | 5.57 | 20.0 |
| Example 11 | 8.22 | 34.5 |
| Example 12 | 5.88 | 20.0 |
| Example 13 | 8.14 | 30.0 |
| Example 14 | 6.22 | 23.0 |
| Example 15 | 16.5 | 42.0 |
| Example 16 | 7.84 | 31.5 |
| Example 17 | 7.73 | 32.5 |
| Example 18 | 7.63 | 30.0 |
| Comp. Ex. 1 | 7.88 | 31.0 |
| Comp. Ex. 2 | 7.89 | 31.5 |
| Comp. Ex. 3 | 7.96 | 32.5 |
| Comp. Ex. 4 | 8.06 | 30.0 |
| Comp. Ex. 5 | 5.62 | 20.5 |
| Comp. Ex. 6 | 7.75 | 31.0 |
| Comp. Ex. 7 | 3.8 | 15.0 |
| Comp. Ex. 8 | 4.4 | 18.0 |
| Comp. Ex. 9 | 22.4 | 53.0 |

(Examples 19 to 29 and Comparative Examples 10 to 13)

—Production of Ink Set—

Using the recording inks produced in Examples 1 to 18 and Comparative Examples 1 to 9 and according to the combinations shown in Table 2, the ink sets of Examples 19 to 29 and Comparative Examples 10 to 13 were produced.

TABLE 2

| | Ink Set Components | | | |
|---|---|---|---|---|
| Ink Set | Cyan Ink | Yellow Ink | Magenta Ink | Black Ink |
| Example 19(*) | Example 1 | Example 3 | Example 2 | Example 4 |
| Example 20 | Example 5 | Example 7 | Example 6 | Example 8 |
| Example 21 | Example 9 | Example 11 | Example 10 | Example 12 |
| Example 22 | Example 1 | Example 11 | Example 10 | Example 13 |

TABLE 2-continued

| | Ink Set Components | | | |
|---|---|---|---|---|
| Ink Set | Cyan Ink | Yellow Ink | Magenta Ink | Black Ink |
| Example 23 | Example 5 | Example 3 | Example 2 | Example 14 |
| Example 24 | Example 1 | Example 3 | Example 2 | Example 8 |
| Example 25 | Example 5 | Example 7 | Example 6 | Example 4 |
| Example 26 | Example 1 | Example 3 | Example 2 | Example 12 |
| Example 27 | Example 5 | Example 3 | Example 10 | Example 4 |
| Example 28 | Example 9 | Example 3 | Example 2 | Example 8 |
| Example 29 | Example 15 | Example 3 | Example 2 | Example 4 |
| Comp. Ex. 10 | Comp. Ex. 1 | Comp. Ex. 3 | Comp. Ex. 2 | Comp. Ex. 4 |
| Comp. Ex. 11 | Comp. Ex. 5 | Comp. Ex. 3 | Comp. Ex. 6 | Comp. Ex. 4 |
| Comp. Ex. 12 | Comp. Ex. 1 | Comp. Ex. 3 | Comp. Ex. 6 | Comp. Ex. 4 |
| Comp. Ex. 13 | Comp. Ex. 5 | Comp. Ex. 3 | Comp. Ex. 2 | Comp. Ex. 4 |

(*)Table 2 means, for example, the ink set of Example 19 was produced consisting of the cyan ink produced in Example 1, the yellow ink produced in Example 3, the magenta ink produced in Example 2 and the black ink produced in Example 4.

Next, with respect to the inks (produced in Examples 1 to 18 and Comparative Examples 1 to 9) and ink sets (produced in Examples 19 to 29 and Comparative Examples 10 to 13), the color developing properties and the delivery stability were evaluated as follows. The result of the evaluation is shown in Table 3 and Table 4.

<Evaluation 1. Color Image Evaluation-Color Developing Properties (Color Saturation) Evaluation>

Figure 2:
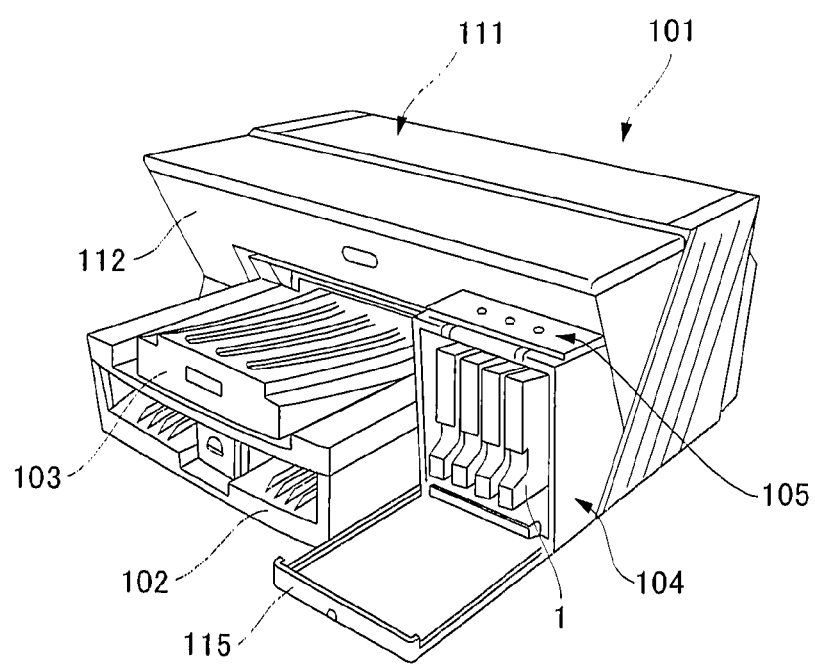
FIG. 2 is an explanatory view schematically showing an example of the inkjet recording apparatus according to the present invention.

Using the above-noted inks and ink sets and the printer shown in FIGS. 2 to 4, the printing-test pattern was printed on the paper for the printing test (manufactured and sold by NBS RICOH Co., Ltd.; trade name: My Paper) under a condition of 100% duty of each color of yellow, magenta and cyan colors. The printing conditions were the recording density of 360 dpi and the one pass printing.

After the drying of the printing-test pattern, the solid image part of each color (such as yellow, magenta and cyan) and each mixed color thereof (such as blue, green and red) was respectively subjected to the measurement using a spectrophoto-densitometer of reflection type (manufactured and sold by X-Rite Corporation, U.S.A.) and the coordinate in (L*a*b*) color space specified by the CIE (Commision International de l'Eclairage) was required with respect to each color of the above-noted six colors so that the color saturation C* was calculated with respect to each color according to the following equation:

$$C^* = \{(a^*)^2 + (b^*)^2\}^{1/2} \qquad \text{<Equation 1>}.$$

The result of the calculation of the color saturation is shown in Table 3.

TABLE 3

| | Yellow | Magenta | Cyan | Red | Green | Blue |
|---|---|---|---|---|---|---|
| Example 19 | 82.09 | 61.88 | 51.67 | 55.92 | 44.98 | 38.96 |
| Example 20 | 81.24 | 61.68 | 51.04 | 55.74 | 44.75 | 38.75 |
| Example 21 | 81.35 | 60.55 | 51.44 | 55.51 | 44.86 | 38.75 |
| Example 22 | 81.37 | 60.68 | 51.62 | 55.49 | 44.91 | 38.83 |
| Example 23 | 82.01 | 61.72 | 51.11 | 55.87 | 44.88 | 38.81 |
| Example 24 | 82.06 | 61.69 | 51.58 | 55.91 | 44.87 | 38.89 |
| Example 25 | 81.19 | 60.71 | 51.16 | 55.72 | 44.73 | 38.71 |
| Example 26 | 81.99 | 61.73 | 51.59 | 55.91 | 44.92 | 38.86 |
| Example 27 | 82.07 | 60.63 | 51.37 | 55.48 | 44.81 | 38.75 |
| Example 28 | 82.06 | 61.89 | 51.18 | 55.87 | 44.79 | 38.8 |
| Example 29 | 82.05 | 61.82 | 51.42 | 55.87 | 44.77 | 38.92 |
| Comp. Ex. 10 | 78.73 | 60.01 | 49.75 | 54.11 | 42.22 | 35.87 |
| Comp. Ex. 11 | 78.98 | 59.42 | 49.44 | 54.21 | 42.19 | 35.44 |
| Comp. Ex. 12 | 78.61 | 59.67 | 49.69 | 54.19 | 42.23 | 35.59 |
| Comp. Ex. 13 | 78.60 | 60.07 | 49.51 | 54.14 | 42.14 | 35.91 |

<Evaluation 2 Delivery Stability Evaluation During Intermittent Printing>

Using the above-noted inks and ink sets and the printer shown in FIGS. 2 to 4, the printing-test pattern in which the ratio of the printing area of each color to all area of the image printing region was 5%, was printed on the paper for the printing test (manufactured and sold by NBS RICOH Co., Ltd.; trade name: My Paper) under a condition of 100% duty of each color of yellow, magenta and cyan colors. The printing conditions were the recording density of 360 dpi and the one pass printing.

The printing was performed in such an intermittent-printing mode that a set consisting of printing the above-noted printing test pattern continuously on 20 sheets of the paper and stopping the printing (i.e., stopping the delivering of the ink) was repeated. After the above-noted set was repeated 50 times (i.e., the printing was performed in total on 1,000 sheets of the paper), one more time the above-noted printing-test pattern was printed on a paper and with respect to the solid image part of the printed pattern, the presence of an error-printed line, a void of printing and an injection turbulence was visually observed, thereby evaluating the delivery stability of each ink by the above-noted observation according to the following criteria.

[Evaluation Criteria]

A: no error-printed line, no void of printing and no injection turbulence was observed in the solid image part of the printed pattern.

B: an error-printed line, a void of printing or no injection turbulence was slightly observed.

C: an error-printed line, a void of printing or no injection turbulence was observed in the first scan.

D: an error-printed line, a void of printing or no injection turbulence was observed in all area of the solid image part of the printed pattern.

TABLE 4

| | Delivery Stability | | Delivery Stability |
|---|---|---|---|
| Example 19 | A | Comp. Ex. 7 | C |
| Example 20 | A | Comp. Ex. 8 | C |
| Example 21 | A | Comp. Ex. 9 | C |
| Example 22 | A | Example 15 | A |
| Example 23 | A | Example 16 | A |
| Example 24 | A | Example 17 | A |
| Example 25 | A | Example 18 | A |
| Example 26 | A | | |
| Example 27 | A | | |
| Example 28 | A | | |
| Example 29 | A | | |
| Comp. Ex. 10 | C | | |
| Comp. Ex. 11 | A | | |
| Comp. Ex. 12 | B | | |
| Comp. Ex. 13 | C | | |

INDUSTRIAL APPLICABILITY

The recording ink according to the present invention is excellent in color developing properties, has a high delivery stability, can improve remarkably color saturation and can form a high-quality image, when the ink is used for printing a plain paper; further, the recording ink according to the present invention can be preferably applied to an ink cartridge, an ink record, an inkjet recording apparatus and an inkjet recording process.

The invention claimed is:

1. A recording ink comprising:
water,
a wetting agent,
a surfactant, and a colorant
wherein
the colorant is an aqueous dispersion of polymer fine particles comprising a colorant,
the wetting agent comprises 3-methyl-1,3-butanediol,
the surfactant is at least one of the group of compounds selected from the group consisting of compounds represented by the formula (I):

$$CF_3CF_2(CF_2CF_2)_m\text{—}CH_2CH_2O(CH_2CH_2O)_nH \qquad \text{Formula (I)}$$

wherein "m" is an integer of 0 to 10 and "n" is an integer of 1 to 40, and
the recording ink is at least one selected from the group consisting of a cyan ink, a magenta ink, and a yellow ink.

2. The recording ink according to claim 1,
wherein the wetting agent is any one of (1) a combination of 3-methyl-1,3-butanediol and glycerin and (2) a combination selected from the group consisting of combinations of (i) 3-methyl-1,3-butanediol, glycerin and at least one of (ii) 1,3butanediol, triethylene glycol, 1,5-pentadiol, propylene glycol, 2-methyl-2,4-pentadiol, diethylene glycol, dipropylene glycol, trimethylol propane and trimethylol ethane.

3. The recording ink according to claim 1,
wherein an amount of the wetting agent in the recording ink is from 20% by mass to 50 by mass.

4. The recording ink according to claim 1,
wherein the polymer of the polymer fine particles is a vinyl polymer or a polyester polymer.

5. The recording ink according to claim 1,
wherein the recording ink further comprises a $C_8$ to $C_{11}$ polyol compound and a glycol ether compound.

6. The recording ink according to claim 5,
wherein the $C_8$ to $C_{11}$ polyol compound is 2-ethyl-1,3-hexanediol or 2,2,4-trimethyl-1,3-pentanediol.

7. The recording ink according to claim 1, wherein a viscosity of the recording ink at 25° C. is in the range from 5 mPa·sec to 20 mPa·sec.

8. An ink cartridge comprising:
a container and a recording ink contained in the container,
wherein the recording ink is the recording ink according to claim 1.

9. An inkjet recording apparatus comprising:
an ink ejecting unit by which to a recording ink, a stimulation is applied and the recording ink is ejected for forming the image,
wherein the recording ink is the recording ink according to claim 1.

10. The inkjet recording apparatus according to claim 9,
wherein the stimulation is one selected from the group consisting of heat, pressure, vibration and light.

11. The ink jet recording apparatus according to claim 9,
wherein at least a part of the liquid space part, fluid resistance part, vibrating plate and nozzle of the inkjet head is produced using a material comprising at least one of silicone and nickel.

12. The inkjet recording apparatus according to claim 11,
wherein the nozzle of the inkjet head has a diameter of 30 μm or less.

13. An inkjet recording process comprising:
ejecting a recording ink by which to the recording ink, a stimulation is applied and the recording ink is ejected for forming the image,
wherein the recording ink is the recording ink according to claim 1.

14. The inkjet recording process according to claim 13,
wherein the stimulation is one selected from the group consisting of heat, pressure, vibration and light.

15. An ink record comprising:
an image formed on a recording medium using a recording ink,
wherein the recording ink is the recording ink according to claim 1.

* * * * *

UNITED STATES PATENT AND TRADEMARK OFFICE
CERTIFICATE OF CORRECTION

PATENT NO.        : 7,682,011 B2                                                Page 1 of 1
APPLICATION NO.  : 10/593345
DATED              : March 23, 2010
INVENTOR(S)       : Namba et al.

It is certified that error appears in the above-identified patent and that said Letters Patent is hereby corrected as shown below:

On the title page, Item (22) is incorrect and Items (86) and (87), the PCT information, is missing. Items (22), (86) and (87), should read:

-- (22) PCT Filed: Mar. 17, 2005

(86) PCT No.: PCT/JP2005/005445

§ 371 (c)(1),
(2), (4) Date: Jan. 10, 2007

(87) PCT Pub. No.: WO/2005/090495

PCT Pub. Date: Sep. 29, 2005 --

Signed and Sealed this

Fifteenth Day of June, 2010

David J. Kappos
*Director of the United States Patent and Trademark Office*